(12) United States Patent
Tan et al.

(10) Patent No.: US 12,041,408 B2
(45) Date of Patent: Jul. 16, 2024

(54) COMPUTER PERIPHERAL DEVICES

(71) Applicant: Razer (Asia-Pacific) Pte. Ltd., Singapore (SG)

(72) Inventors: Min-Liang Tan, Singapore (SG); Andrew Philippou, Singapore (SG); Hongzheng Liao, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 356 days.

(21) Appl. No.: 17/604,381

(22) PCT Filed: Sep. 27, 2019

(86) PCT No.: PCT/SG2019/050494
§ 371 (c)(1),
(2) Date: Oct. 15, 2021

(87) PCT Pub. No.: WO2020/214085
PCT Pub. Date: Oct. 22, 2020

(65) Prior Publication Data
US 2022/0225010 A1  Jul. 14, 2022

Related U.S. Application Data

(60) Provisional application No. 62/834,864, filed on Apr. 16, 2019.

(51) Int. Cl.
*H04R 1/10* (2006.01)
*F21V 33/00* (2006.01)
*H04R 1/02* (2006.01)

(52) U.S. Cl.
CPC ....... *H04R 1/1041* (2013.01); *F21V 33/0056* (2013.01); *H04R 1/028* (2013.01); *H04R 1/1008* (2013.01); *H04R 1/1033* (2013.01)

(58) Field of Classification Search
CPC .... H04R 1/1041; H04R 1/028; H04R 1/1008; H04R 1/1033; F21V 33/0056
See application file for complete search history.

(56) References Cited

U.S. PATENT DOCUMENTS 9,803,852 B1    10/2017  Clacken
2009/0034778 A1  2/2009  Chi
(Continued)

FOREIGN PATENT DOCUMENTS

| CN | 1275042 A   | 11/2020 |
| GB | 2352938 A   | 2/2001  |
| TW | 201419883 A | 5/2014  |

OTHER PUBLICATIONS

International Search Report and Written Opinion, dated Apr. 13, 2020, for the corresponding International Application No. PCT/SG2019/050494 in 12 pages.
(Continued)

*Primary Examiner* — Sejoon Ahn
(74) *Attorney, Agent, or Firm* — Polsinelli PC

(57) ABSTRACT

A headset may include a headband; first and second earcups respectively attached to first and second ends of the headband; a first light display unit; a headset receiver configured to receive data from a processor-based device; and a headset control unit. Each of the first and second earcups may include an interior surface and an exterior surface, where the interior surfaces of the first and second earcups may face each other and the exterior surfaces of the first and second earcups may face away from each other. The first light display unit may include a matrix of independently controllable light emitting elements arranged along a boundary of the exterior surface of the first earcup. The headset control unit may be configured to control the light emitting elements of the first light display unit based on the data received by the headset receiver.

20 Claims, 11 Drawing Sheets

(56) References Cited

U.S. PATENT DOCUMENTS

| | | |
|---|---|---|
| 2016/0088383 A1 | 3/2016 | Yan et al. |
| 2016/0216943 A1 | 7/2016 | Welti et al. |
| 2016/0224315 A1 | 8/2016 | Zhang et al. |
| 2017/0340184 A1* | 11/2017 | Muhammad ............ A47L 13/42 |
| 2017/0347183 A1* | 11/2017 | Masaki ................ H04R 1/1041 |
| 2017/0347348 A1* | 11/2017 | Masaki ................ H04W 72/20 |
| 2018/0120571 A1* | 5/2018 | Yang ................... H04R 1/1025 |
| 2018/0121155 A1* | 5/2018 | Zheng .................... G06F 3/165 |
| 2018/0121156 A1* | 5/2018 | Zhen .................... H04R 1/1041 |
| 2018/0125038 A1* | 5/2018 | Hord ...................... G08B 15/00 |
| 2018/0224108 A1 | 8/2018 | Kettering et al. |

OTHER PUBLICATIONS

Taiwan Intellectual Property Office 1st Office Action; dated Nov. 20, 2023; application # 109107916.

* cited by examiner

COMPUTER PERIPHERAL DEVICES

TECHNICAL FIELD

Various embodiments generally relate to computer peripheral devices. In particular, various embodiments generally relate to computer peripheral devices (such as headsets and microphones) including one or more light display units for live broadcast, and methods of controlling the light display unit(s) of the computer peripheral devices.

BACKGROUND

Live streaming or broadcasting platforms (e.g. Twitch, Douyu, Huya, Mixer, Facebook and Youtube) are widely used by different users nowadays to broadcast various types of activities and/or messages. For example, some users (broadcasters) utilize the broadcasting platforms while playing games to broadcast not only the gameplay, but also themselves during the gameplay to for example, provide commentaries to the game. Some other users employ the broadcasting platforms to provide information or market certain products. Several broadcasting platforms also provide viewers of the broadcasts a variety of response mechanisms so that the viewers may share their thoughts on the broadcasts. For example, the viewers can click a button to follow the broadcaster's live broadcast channel or send a chat message to the broadcaster. The activation of one of the response mechanisms by a viewer may be referred to as an action and the broadcaster may receive a notification from the broadcasting platform whenever an action occurs.

It is often challenging to achieve timely interaction between the broadcasters and the viewers, or between different viewers during a broadcast. For example, there is usually a delay between the occurrence of an action and the time at which the broadcaster or another viewer knows about this occurrence. This is because the notifications received by the broadcasters and viewers when an action occurs are usually in the form of sound notifications, screen notifications or lighting cues which are not easily noticeable by the broadcasters and viewers during the live broadcast.

Accordingly, there is a need for methods and devices to improve the interaction between the broadcasters and the viewers during a live broadcast.

SUMMARY

According to various embodiments, there may be provided a headset including: a headband; a first earcup attached to a first end of the headband and a second earcup attached to a second end of the headband; a first light display unit; a headset receiver configured to receive data from a processor-based device; and a headset control unit. Each of the first earcup and the second earcup may include an interior surface and an exterior surface, where the interior surfaces of the first and second earcups may face each other and the exterior surfaces of the first and second earcups may face away from each other. The first light display unit may include a matrix of independently controllable light emitting elements arranged along a boundary of the exterior surface of the first earcup. The headset control unit may be configured to control the light emitting elements of the first light display unit based on the data received by the headset receiver.

According to various embodiments, there may be provided a microphone including: a base; a sound receiving element attached to the base; a shielding element; a light display unit arranged at least partially between the sound receiving element and the shielding element, where the light display unit may include a matrix of independently controllable light emitting elements arranged to project light towards the shielding element; a microphone receiver configured to receive data from a processor-based device; and a microphone control unit configured to control the light emitting elements of the light display unit based on the data received by the microphone receiver.

According to various embodiments, there may be provided a method of controlling one or more light display units, where each light display unit may include a matrix of independently controllable light emitting elements and where the method may include: receiving data from one or more broadcasting platforms configured to perform a live broadcast, where the data may indicate occurrence of a live event related to the live broadcast; comparing the received data with stored settings, where the stored settings may indicate, for each type of multiple types of events, one or more light display units to be changed upon occurrence of the type of event, and an adjustment to be made to each light emitting element of each light display unit to be changed; and for each light display unit, determining whether the light display unit is to be changed based on the comparing; if the light display unit is determined as to be changed, determining an adjustment to be made to each light emitting element of the light display unit based on the stored settings; and adjusting the light emitting elements of the light display unit based on the determined adjustments.

According to various embodiments, there may be provided a device for controlling one or more light display units, where each light display unit may include a matrix of independent controllable light emitting elements and where the device may include: a data receiving unit configured to receive data from one or more broadcasting platforms configured to perform a live broadcast, where the data may indicate occurrence of a live event related to the live broadcast; a data comparing unit configured to compare the received data with stored settings, where the stored settings may indicate, for each type of multiple types of events, one or more light display units to be changed upon occurrence of the type of event, and an adjustment to be made to each light emitting element of each light display unit to be changed; and a light display controller configured to, for each light display unit, determine whether the light display unit is to be changed based on the comparing; if the light display unit is determined as to be changed, determine an adjustment to be made to each light emitting element of the light display unit based on the stored settings; and adjust the light emitting elements of the light display unit based on the determined adjustments.

According to various embodiments, there may be provided a computer executing a program implementing the above-mentioned method of controlling one or more light display units.

According to various embodiments, there may be provided a non-transitory computer-readable medium including instructions which, when executed by a processor, makes the processor perform the above-mentioned method of controlling one or more light display units.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Figure 1:
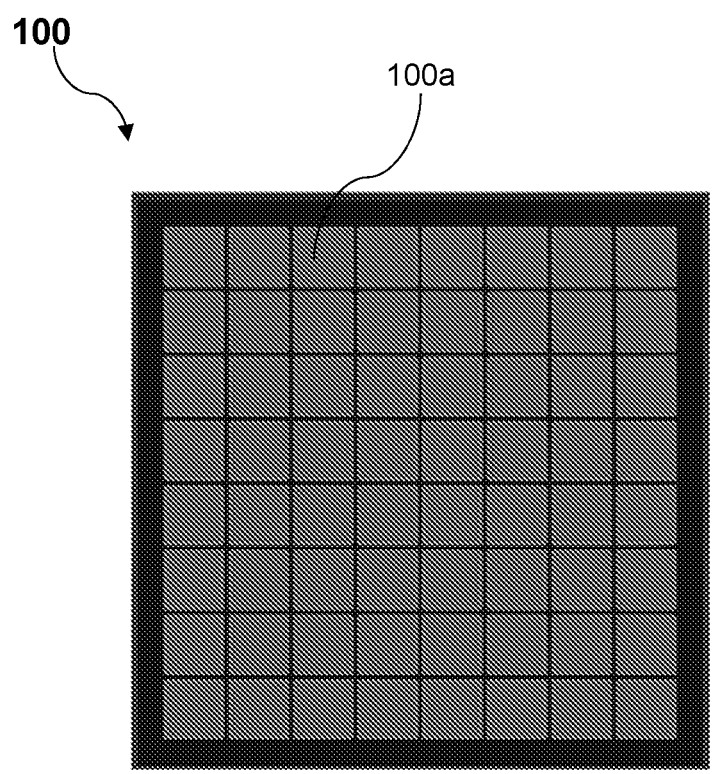
FIG. 1 shows a front view of a light display unit according to various embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Embodiments described below in the context of the device are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Broadcasters often use a variety of computer peripheral devices during live broadcasts. These computer peripheral devices may be connected to a processor-based device which may be a host computer or a computing device on which an application such as a broadcasting platform may be run. The computer peripheral devices may be configured to provide input data and receive output data to and from the processor-based device when the application is run. For example, when a broadcasting platform is run to broadcast a live stream, broadcasters may use headsets to listen for sound notifications and/or use a microphone to magnify the volume of his/her voice so that the voice is more clearly audible to the viewers.

Various embodiments of the present invention generally relate to computer peripheral devices that can be used during a broadcast, where the computer peripheral devices may include display functions to improve the interaction between the broadcasters and the viewers. In various embodiments, each computer peripheral device may include at least one light display unit that is capable of displaying lighting effects, or still or animated graphics (such as emoji's), upon occurrence of certain actions or groups of actions occurring on the broadcasting platform. The graphics or effects to be displayed in response to the occurrence of various actions may be predetermined based on user input provided prior to the live broadcast/live stream. The computer peripheral devices may include devices such as, but not limited to, keyboards, mice, mouse pads, headsets, microphones, web cams, portable colour changing lights etc. The at least one light display unit may be positioned such that the broadcaster may see it through his/her peripheral vision and the viewers may see it through the live broadcast. Therefore, the broadcasters and the viewers may be alerted to the occurrence of the events in a more timely fashion, which can in turn improve the real time interaction between the broadcasters and the viewers, and between different viewers during a live broadcast.

FIG. 1 shows a front view of a light display unit 100 according to various embodiments. The light display unit 100 may include a matrix of light emitting elements 100a arranged adjacent to each other. As one example, the light emitting elements 100a are arranged in an N×M matrix wherein N and M are integers greater than or equal to one. For example, the light display unit 100 may be a light emitting diode (LED) display panel and each light emitting element 100a may include a LED. Although the light display unit 100 is depicted as having an 8×8 matrix of light emitting elements 100a in FIG. 1, the light display unit 100 may include any number of light emitting elements 100a. Further, the light emitting elements 100a in the light display unit 100 may be arranged in a manner different from that shown in FIG. 1. By way of example, the light display unit 100 may be formed in a 3D shape such as a cube, pyramid, triangular prism or rectangular prism or other shapes. In various embodiments, the light emitting elements 100a may be organic light-emitting diodes or neon lights. The light display unit 100 may be a Liquid Crystal Display (LCD) or a plasma display. In various embodiments, the light emitting elements 100a may be independently controllable by an external control unit. In various embodiments, each light emitting element 100a may be configured to adopt one or more states out of a plurality of states. Each state may represent one or both of a color of the light emitting element 100a and a brightness of the light emitting element 100a. In various embodiments, the light display unit 100 may be used with a computer peripheral device such as a headset or a microphone.

Figure 2A:
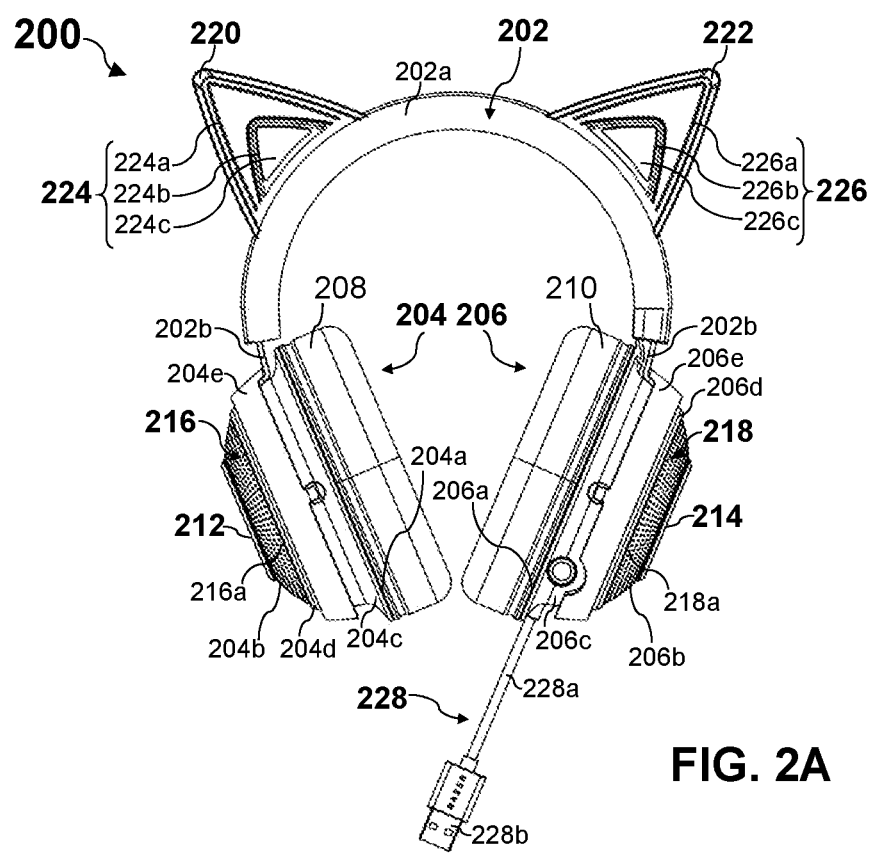
FIGS. 2A to 2B respectively show a front view and a back view, of a headset according to various embodiments.
Figure 2B:
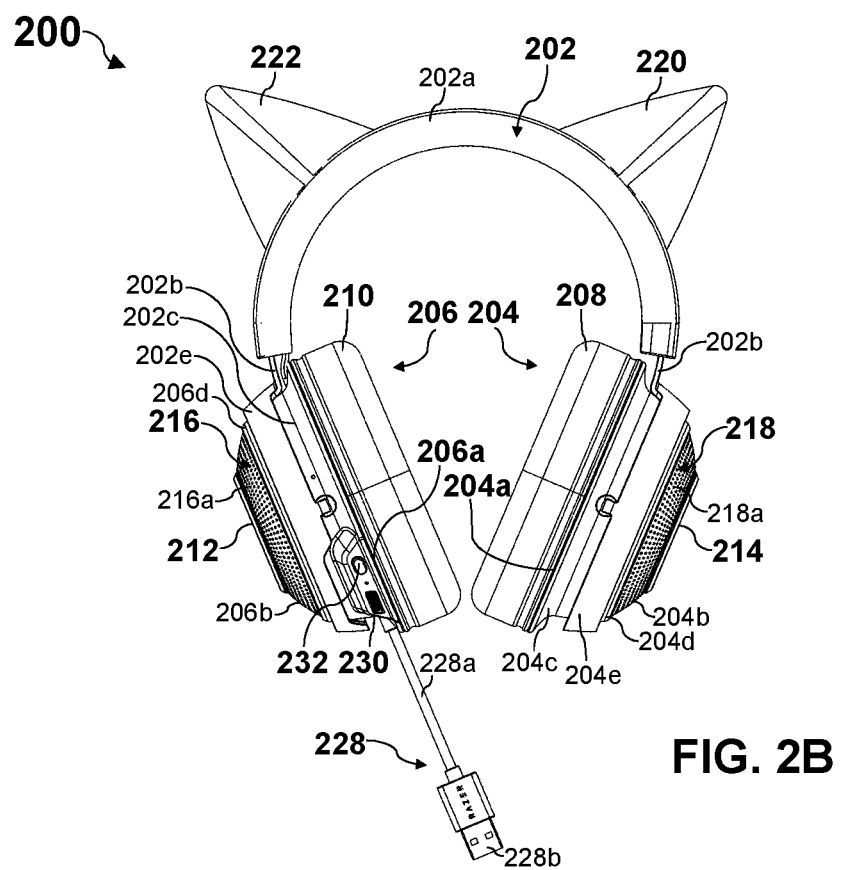

FIG. 2A shows a front view of a headset 200 according to various embodiments. FIG. 2B shows a back view of the headset 200. The headset 200 may be worn by a broadcaster during a live broadcast to for example, listen for sound notifications. Occasionally, the headset 200 may be visible to one or more viewers through the live broadcast (e.g. through the live video stream).

As shown, in various embodiments, the headset 200 may include a headband 202 wearable over a user's head, where the headband 202 may include a headband cover 202a arranged over a headband frame 202b. The headset 200 may further include a first earcup 204 attached to a first end of the headband 202 and a second earcup 206 attached to a second end of the headband 202. Each of the first earcup 204 and the second earcup 206 may include an interior surface 204a, 206a and an exterior surface 204b, 206b. As shown, the interior surfaces 204a, 206a of the first and second earcups 204, 206 may face each other, whereas the exterior surfaces 204b, 206b of the first and second earcups 204, 206 may face away from each other.

In various embodiments, a first earcup cushion 208 may be attached to the interior surface 204a of the first earcup 204 and a second earcup cushion 210 may be attached to the interior surface 206a of the second earcup 206. When a user wears the headband 202 over his/her head, the interior surfaces 204a, 206a of the earcups 204, 206 may face the user's head and the earcup cushions 208, 210 may abut the user's head to increase the user's comfort when using the headset 200. In various embodiments, each interior surface 204a, 206a of the first and second earcups 204, 206 may be connected to an interior base 204c, 206c and each exterior surface 204b, 206b may be connected to an exterior base 204d, 206d. Each earcup 204, 206 may further include an earcup connector 204e, 206e (such as a clasp) configured to couple the interior base 204c, 206c to the exterior base 204d, 206d.

In various embodiments, the headset 200 may include a first end surface 212 and a second end surface 214, where the first end surface 212 may be arranged on the exterior surface 204b of the first earcup 204 and the second end surface 214 may be arranged on the exterior surface 206b of the second earcup 206. As shown, the exterior surface 204b, 206b of each of the first and second earcups 204, 206 may be arranged at an angle to a plane formed by the corresponding interior surface 204a, 206a of the first and second earcups 204, 206. For example, as shown, the exterior surface 204b, 206b of each of the first and second earcups 204, 206 may be configured to taper away from the corresponding interior surface 204a, 206a of the first and second earcups 204, 206. As shown, the exterior surface 204b, 206b of each of the first and second earcups 204, 206 may taper towards the end surface 212, 214 arranged on the exterior surface 204b, 206b. However, in other embodiments, the exterior surfaces 204b, 206b of the first and second earcups 204, 206 may be substantially flat surfaces.

In various embodiments, the headset 200 may include a first light display unit 216 and a second light display unit 218 substantially similar to the light display unit 100 of FIG. 1. The first light display unit 216 may include a matrix of independently controllable light emitting elements 216a arranged along a boundary of the exterior surface 204b of the first earcup 204. Similarly, the second light display unit 218 may include a matrix of independently controllable light emitting elements 218a arranged along a boundary of the exterior surface 206b of the second earcup 206. As one example, the light emitting elements 216a, 218a of each light display unit 216, 218 are arranged in an N×M matrix wherein N and M are integers greater than or equal to one. As shown in FIGS. 2A to 2B, the light emitting elements 216a, 218a of each light display unit 216, 218 may be arranged on the entire exterior surface 204b, 206b of the respective earcup 204, 206. However, in other embodiments, the light emitting elements 216a, 218a may be arranged on only a part of the exterior surface 204b, 206b of the respective earcup 204, 206. For example, each of the first and second light display units 216, 218 may include a single row of light emitting elements 216a, 218a arranged along a boundary of the exterior surface 204b, 206b of the respective earcup 204, 206. Further, as shown in FIGS. 2A to 2B, each light display unit 216, 218 may be arranged on the respective earcup 204, 206 with respect to the end surface 212, 214, such that the light display unit 216, 218 may be entirely external of the end surface 212, 214. For example, each light display unit 216, 218 may include a strip of light emitting elements 216a, 218a. However, in other embodiments, one or more light emitting elements 216a, 218a of the light display unit 216, 218 may be arranged on the respective end surface 212, 214, and in some embodiments, light emitting elements 216a, 218a of the light display unit 216, 218 may be arranged on the entire respective end surface 212, 214. Although not shown in the figures, in some embodiments, the headset 200 may include one or more separate light display units attached on one or both end surfaces 212, 214. Each of these one or more separate light display units may include a plurality of light emitting elements arranged to form a graphic such as a logo.

The headset 200 may further include at least one peripheral element. For example, as shown in FIGS. 2A to 2B, the headset 200 may further include a first peripheral element 220 and a second peripheral element 222. Each peripheral element 220, 222 may have a shape resembling a cat's ear, and thus, may be referred to as a "kitty ear". In the embodiment shown in FIGS. 2A to 2B, the peripheral elements 220, 222 and the headband 202 may be formed as a single integral unit. However, in other embodiments, the peripheral elements 220, 222 may be detachably connected to the headband 202. Although the headset 200 is depicted as having two peripheral elements 220, 222, it is understood that the headset 200 may include fewer or more peripheral elements in alternative embodiments.

In various embodiments, the headset 200 may also include a further light display unit attached to each of the at least one peripheral element 220, 222, where each further light display unit may include a plurality of independently controllable light emitting elements. For example, as shown in FIGS. 2A to 2B, the headset 200 may include a third light display unit 224 attached to the first peripheral element 220 and a fourth light display unit 226 attached to the second peripheral element 222. The third and fourth light display units 224, 226 may be substantially similar and may each include a plurality of independently controllable light emitting elements 224a, 224b, 224c, 226a, 226b, and 226c arranged along or inside a boundary of the respective peripheral element 220, 222. For example, each of the third and fourth light display units 224, 226 may include a first plurality of light emitting elements 224a, 226a arranged along a boundary of the respective peripheral element 220, 222, a second plurality of light emitting elements 224b, 226b arranged along a boundary of a shape within the respective peripheral element 220, 222, and a third plurality of light emitting elements 224c, 226c arranged inside the boundary of a shape within the respective peripheral element 220, 222. For example, as shown in FIG. 2A, each of the third and fourth light display units 224, 226 may include a first plurality of light emitting elements 224a, 226a arranged along a boundary of the respective kitty ear 220, 222, a second plurality of light emitting elements 224b, 226b arranged along a boundary of a triangle within the respective kitty ear 220, 222, and a third plurality of light emitting elements 224c, 226c arranged inside the boundary of a triangle within the respective kitty ear 220, 222.

The headset 200 may further include a headset receiver 228 configured to receive data from a processor-based device. As shown, the headset receiver 228 may include a cable 228a retractably attached to the second earcup 206 (although the cable 228a may alternatively be retractably attached to the first earcup 204) and a connector 228b at an end of the cable 228a, where the connector 228b may be configured to connect the headset 200 to the processor-based device. The connector 228b may be in the form of a universal serial bus (USB) connector as shown in FIGS. 2A to 2B, but may also be in the form of other types of connectors as known to those skilled in the art. Although the headset receiver 228 is depicted as having a cable 228a in FIGS. 2A to 2B, the headset receiver 228 may be any unit capable of receiving data from the processor-based device. For example, the headset receiver 228 may include an antenna capable of wirelessly receiving data from the processor-based device.

The headset 200 may further include control elements 230, 232 for adjusting various settings of the headset 200, and for switching the headset 200 on and off. For example, the control elements 230, 232 may include a volume dial 230 for controlling a volume of the headset 200 and a power button 232 for switching the headset 200 on and off. As shown, the control elements 230, 232 may be arranged on the second earcup 206 (although, they may alternatively be arranged on the first earcup 204), such that the user may easily access them.

Although not shown in the figures, the headset 200 may further include a headset control unit configured to control the light emitting elements 216a, 218a, 224a, 226a, 224b, 226b, 224c, 226c of the light display units 216, 218, 224, 226 based on the data received by the headset receiver 228. The headset control unit may be configured to independently control the light emitting elements 216a, 218a, 224a, 226a, 224b, 226b, 224c, 226c of each light display unit 216, 218, 224, 226, respectively. For example, the headset control unit may be configured to independently control the light emitting elements 216a, 218a of the first light display unit 216 and the second light display unit 218, respectively. For example, the headset control unit may be further configured to independently control the light emitting elements 216a, 218a of the first and second light display units 216, 218, and the light emitting elements 224a, 226a, 224b, 226b, 224c, 226c of each of the third and fourth light display units 224, 226. In some embodiments, the headset control unit may be configured to control the light emitting elements 216a, 218a of the first and second light display units 216, 218 together, and the first, second or third plurality of light emitting elements 224a, 226a/224b, 226b/224c, 226c of the third and fourth light display units 224, 226 together, but the light emitting elements 216a, 218a of the first and second light display units 216, 218 may be controlled independently from the first, second or third plurality of light emitting elements 224a, 226a/224b, 226b/224c, 226c of the third and fourth light display units 224, 226.

In various embodiments, each light display unit 216, 218, 224, 226 may be configured to display a still graphic (e.g. a logo) or an animation (e.g. animated graphic or light effects). As mentioned above, the light display units 216, 218, 224, 226 may be substantially similar to the light display unit 100 described in FIG. 1. In other words, the light emitting elements 216a, 218a, 224a, 224b, 224c, 226a, 226b, 226c of each light display unit 216, 218, 224, 226 may be independently controllable. Further, each light emitting element 216a, 218a, 224a, 224b, 224c, 226a, 226b, 226c of the light display units 216, 218, 224, 226 may be configured to adopt one or more states out of a plurality of states, where the state of each light emitting element 216a, 218a, 224a, 224b, 224c, 226a, 226b, 226c may represent one or both of a color of the light emitting element 216a, 218a, 224a, 224b, 224c, 226a, 226b, 226c and a brightness of the light emitting element 216a, 218a, 224a, 224b, 224c, 226a, 226b, 226c. In various embodiments, for each light display unit 216, 218, 224, 226, the data received by the headset receiver 228 may include at least one state for each light emitting element 216a, 218a, 224a, 224b, 224c, 226a, 226b, 226c of the light display unit 216, 218, 224, 226, and the headset control unit may be configured to adjust each light emitting element 216a, 218a, 224a, 224b, 224c, 226a, 226b, 226c of the light display unit 216, 218, 224, 226 according to the at least one state provided in the data for the respective light emitting element 216a, 218a, 224a, 224b, 224c, 226a, 226b, 226c. In some embodiments, the data received by the headset receiver 228 may represent a still graphic. In these embodiments, the received data may include a single state for adjusting each light emitting element 216a, 218a, 224a, 224b, 224c, 226a, 226b, 226c of each light display unit 216, 218, 224, 226. In other embodiments, the data received by the headset receiver 228 may represent an animation (e.g. an animated graphic or light effects). In these embodiments, for each light display unit 216, 218, 224, 226, the received data may include a sequence of states for each light emitting element 216a, 218a, 224a, 224b, 224c, 226a, 226b, 226c of the light display unit 216, 218, 224, 226, and the headset control unit may be configured to adjust each light emitting element 216a, 218a, 224a, 224b, 224c, 226a, 226b, 226c to adopt the states provided in the data, where an order in which each light emitting element 216a, 218a, 224a, 224b, 224c, 226a, 226b, 226c adopts the states corresponds to the sequence of the states provided in the data.

In various embodiments, the light emitting elements 216a, 218a, 224a, 224b, 224c, 226a, 226b, 226c of the light display units 216, 218, 224, 226 may be in the form of LEDs. However, they may be in the form of other types of light emitting elements in alternative embodiments. In some embodiments, each light display unit 216, 218, 224, 226 may include a translucent or transparent cover over the light emitting elements 216a, 218a, 224a, 224b, 224c, 226a, 226b, 226c and in some embodiments, a mesh may be arranged over each light display unit 216, 218, 224, 226. In addition, although not shown in the figures, the headset 200 may further include a microphone attached to one of the earcups 204, 206. Further, although the first and second light display units 216, 218 are depicted as substantially similar to each other in FIGS. 2A to 2B, the first and second light display units 216, 218 may be different in other embodiments. Similarly, the third and fourth light display units 224, 226 may be different from each other in some embodiments. In addition, although the headset 200 is depicted as having four light display units 216, 218, 224, 226 in FIGS. 2A to 2B, the headset 200 may include any number of light display units. For example, the headset 200 may include a single one of the light display units 216, 218, 224, 226 or may include more than four light display units. For example, the headset 200 may include only the first light display unit 216 or only the second light display unit 218.

Figure 3A:
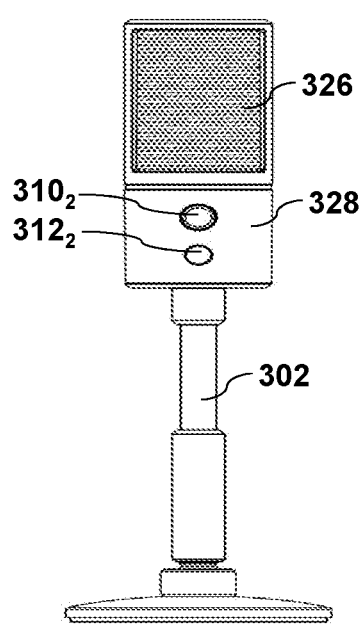
FIGS. 3A to 3E respectively show a front view, a first side view, a back view, a second side view and an exploded view of a part of a microphone according to various embodiments.
Figure 3B:
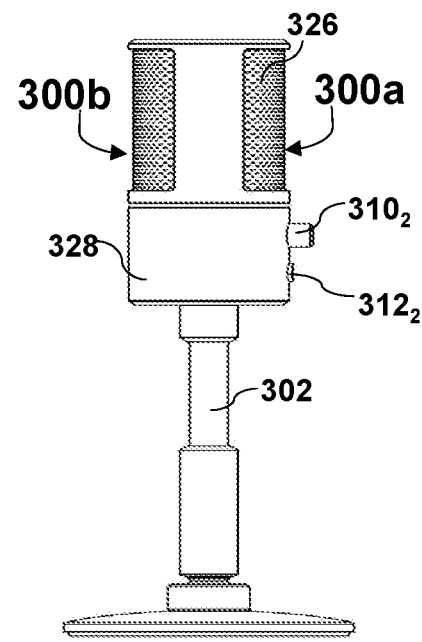
Figure 3C:
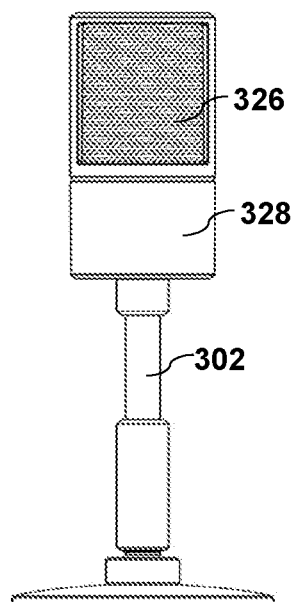
Figure 3D:
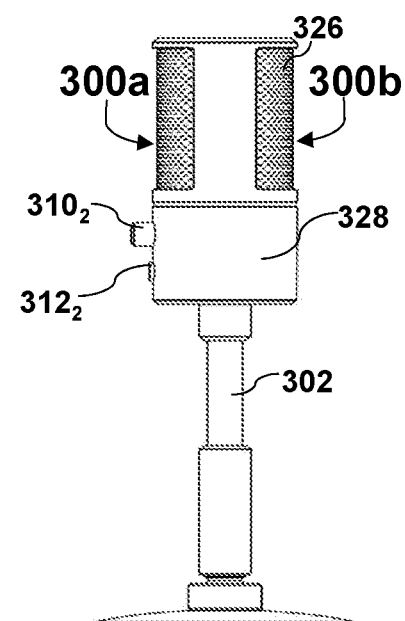
Figure 3E:
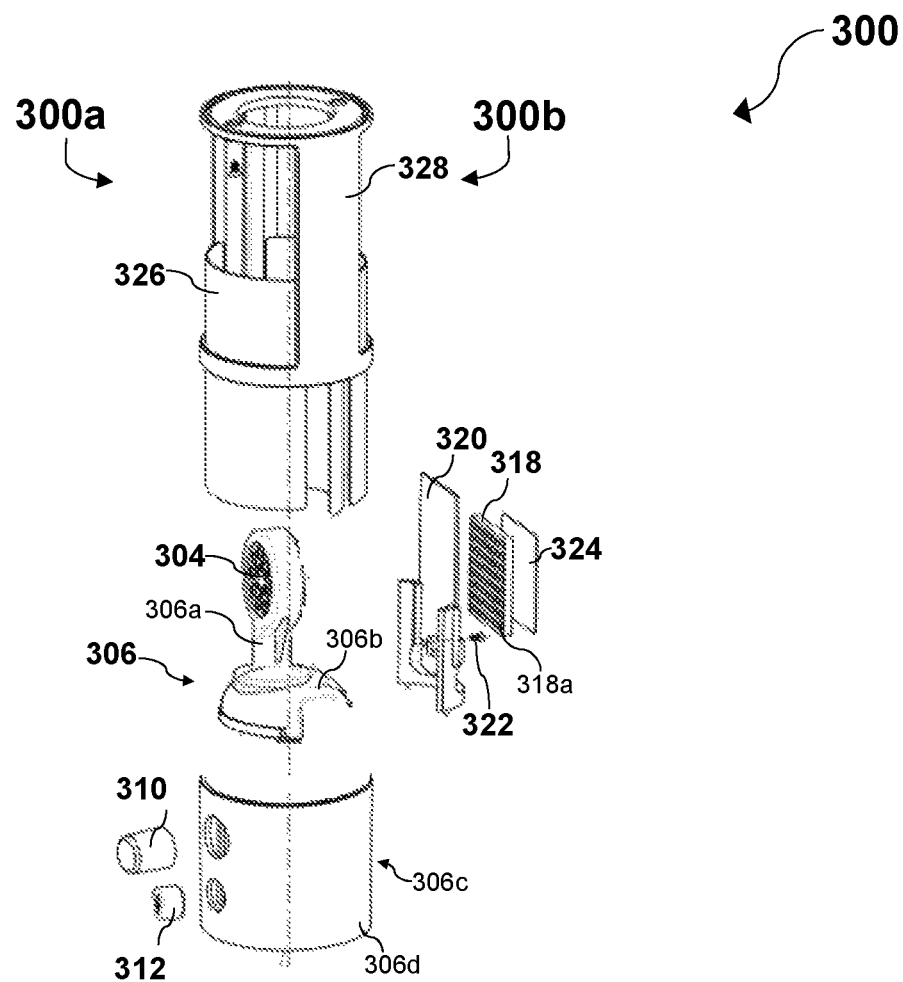

FIG. 3A shows a front view of a microphone 300 according to various embodiments. FIGS. 3B to 3D respectively show a first side view (right view), a back view and a second side view (left view) of the microphone 300. FIG. 3E shows an exploded view of a part of the microphone 300.

In various embodiments shown in FIGS. 3A-3E, the microphone 300 may include a base 302 where a height of the base 302 may be adjustable. The base 302 may further include an elastic element (such as a spring) to enable the adjustment of the height of the base 302.

The microphone 300 may further include a sound receiving element 304. In one example embodiment, the sound receiving element 304 may be attached to the base 302 through a sound receiving element body 306 as shown in FIG. 3E. The sound receiving element body 306 may include first, second and third holders 306a, 306b, 306c. The first holder 306a may have a hole configured to receive the sound receiving element 304 and the second holder 306b may be configured to support the first holder 306a. The third holder 306c may include a hollow cylinder 306d and one or more engaging members (such as rings) arranged on the hollow cylinder 306d. The third holder 306c may further include holes configured to receive control buttons 310, 312. The microphone 300 may further include at least one light display unit, where the at least one light display unit may be substantially similar to the light display unit 100 of FIG. 1. For example, as shown in FIG. 3E, the microphone 300 may include a light display unit 318 having a matrix of independently controllable light emitting elements 318a (such as LEDs). In some embodiments, the matrix of light emitting elements 318a of the light display unit 318 may have a size bigger than a size of the sound receiving element 304. As one example, the light emitting elements 318a are arranged in an N×M matrix wherein N and M are integers greater than or equal to one. For example, the matrix of light emitting elements 318a of the light display unit 318 may include eight rows and eight columns. However, in other embodiments, the matrix of light emitting elements 318a of the light display unit 318 may be of a different size. The light display unit 318 may be attached to a light display holder 320 by light display engaging elements 322 (such as screws), and the light display holder 320 may in turn be connected with the second holder 306b of the sound receiving element body 306. Accordingly, the light display unit 318 may be attached to the base 302 via the light display holder 320 and the sound receiving element body 306. In various embodiments, the microphone 300 may further include a light diffusing element 324 arranged adjacent to the light display unit 318, where the light diffusing element 324 may be configured to diffuse light projected from the light display unit 318.

In various embodiments, the microphone 300 may further include a shielding element 326. The shielding element 326 may be attached to the base 302 in one example embodiment. In various embodiments, a casing 328 configured to hold the shielding element 326 may be arranged with the sound receiving element body 306 and the light display holder 320. In various embodiments, the light display unit 318 may be arranged at least partially between the sound receiving element 304 and the shielding element 326 and may be arranged such that the matrix of light emitting elements 318a project light towards the shielding element 326. For example, as shown in FIG. 3E, the light display unit 318 may be arranged partially between the sound receiving element 304 and the shielding element 326. The light display unit 318 may be arranged at the back side 300b of the microphone 300 and the light emitting elements 318a may project light towards the back side 300b of the microphone 300.

In various embodiments, the microphone 300 may further include a microphone receiver configured to receive data from a processor-based device and a microphone control unit configured to control the light emitting elements 318a of the light display unit 318 based on the data received by the microphone receiver. In various embodiments, the microphone receiver may be a controller element or an antenna. However, in alternative embodiments, the microphone receiver may be any other type of receiver capable of receiving wireless data, or may be a cable having a connector configured to connect to the processor-based device. Control buttons 310 and 312 may also be provided on the controller element.

In various embodiments, the light display unit 318 may be configured to display a still graphic (e.g. a logo) or an animation (e.g. animated graphic or light effects). As mentioned above, the light display unit 318 may be substantially similar to the light display unit 100 described in FIG. 1. In other words, the light emitting elements 318a of the light display unit 318 may be independently controllable. Further, each light emitting element 318a of the light display unit 318 may be configured to adopt one or more states out of a plurality of states, where the state of each light emitting element 318a may represent one or both of a color of the light emitting element 318a and a brightness of the light emitting element 318a. In various embodiments, the data received by the microphone receiver may include at least one state for each light emitting element 318a of the light display unit 318, and the microphone control unit may be configured to adjust each light emitting element 318a of the light display unit 318 according to the at least one state provided in the data for the respective light emitting element 318a. In some embodiments, the data received by the microphone receiver may represent a still graphic. In these embodiments, the received data may include a single state for adjusting each light emitting element 318a of the light display unit 318. In other embodiments, the data received by the microphone receiver may represent an animation (e.g. an animated graphic or light effects). In these embodiments, the received data may include a sequence of states for each light emitting element 318a of the light display unit 318, and the microphone control unit may be configured to adjust each light emitting element 318a to adopt the states provided in the data, where an order in which each light emitting element 318a adopts the states corresponds to the sequence of the states provided in the data.

Although the light display unit 318 is depicted as being arranged at the back side 300b of the microphone 300 in FIG. 3E, in other embodiments, the light display unit 318 may be arranged at the front side 300a of the microphone 300. In alternative embodiments, the light emitting elements 318a of the light display unit 318 may be arranged along a boundary of an intermediate surface that may surround the sound receiving element 304. In one example, the light emitting elements 318a of the light display unit 318 may be arranged on the entire intermediate surface. Further, although the microphone 300 is depicted as having a single light display unit 318 in FIG. 3E, the microphone 300 may have further light display units substantially similar to the light display unit 100 and controllable by the microphone control unit on the controller element 334. For example, the microphone 300 may have a light display unit (first light display unit) and a further light display unit (second light display unit) arranged on opposite sides of the microphone 300. For example, the first light display unit may be arranged at the front side 300a of the microphone 300 and the second light display unit may be arranged at the back side 300b of the microphone 300. In various embodiments, the microphone control unit may be configured to independently control the light emitting elements of the first light display unit and the second light display unit, respectively. In some embodiments, the microphone 300 may include further light display units arranged on the base 302 or on the sound receiving element body 306, where these further light display units may also be substantially similar to the light display unit 100. The further light display units may also be controllable by the microphone control unit on the controller element, either independently in some embodiments or together in other embodiments.

During a live broadcast, a broadcaster may use a live broadcast system including a first processor-based device and one or more computer peripheral devices configured to connect to the first processor-based device of the broadcaster. In various embodiments, the first processor-based device may be a host computer or a computing device on which applications may be run. In various embodiments, the one or more computer peripheral devices may include a video capturing device, such as a web camera, to capture a video of the broadcaster and his/her surroundings. In various embodiments, the one or more computer peripheral devices may further include devices having one or more light display units substantially similar to the light display unit 100. For example, the one or more computer peripheral devices may further include the headset 200 of FIGS. 2A to 2B and/or the microphone 300 of FIGS. 3A to 3E. For example, the broadcaster may use the headset 200 to receive sound notifications from a broadcasting platform running on the first processor-based device and may also use the microphone 300 to amplify his/her voice so that his/her voice is more audible to viewers watching the live broadcast. During the live broadcast, the broadcaster may wear the headset 200 such that the third and fourth light display units 224, 226 face the video capturing device. Further, the broadcaster may arrange the microphone 300 such that the light display unit 318 faces the video capturing device. For example, if the light display unit 318 is arranged at the back side 300b of the microphone 300 (as shown in FIG. 3E), the broadcaster may arrange the microphone 300 such that the backside 300b of the microphone 300 faces the video capturing device. Accordingly, viewers of a live broadcast by the broadcaster may be able to see light projected from the light display units 216, 218, 224, 226 of the headset 200 and the light projected from the light display unit 318 of the microphone 300. In various embodiments, the light projected from each light display unit 216, 218, 224, 226, 318 may depend on the states of the light emitting elements 216a, 218a, 224a, 226a, 224b, 226b, 224c, 226c, 318a of the light display units 216, 218, 224, 226, 318.

Several aspects of controlling light display units of one or more computer peripheral devices will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In various embodiments, the broadcaster may be able to select or design still graphics or animations (such as animated graphics or light effects) to be displayed on the one or more light display units of the one or more computer peripheral devices. The still graphics or animations may include emoji's, logos, or other images. The still graphics or animations may be displayed on the one or more light display units in response to particular events during a live broadcast. Accordingly, viewers of a live broadcast by the broadcaster may see the still graphics or animations during the live broadcast.

In various embodiments, the broadcaster may determine the still graphics or animations to be displayed on each light display unit and the type of events that trigger the display of each still graphic or animation, by providing user input to his/her first processor-based device prior to the live broadcast.

Figure 4:
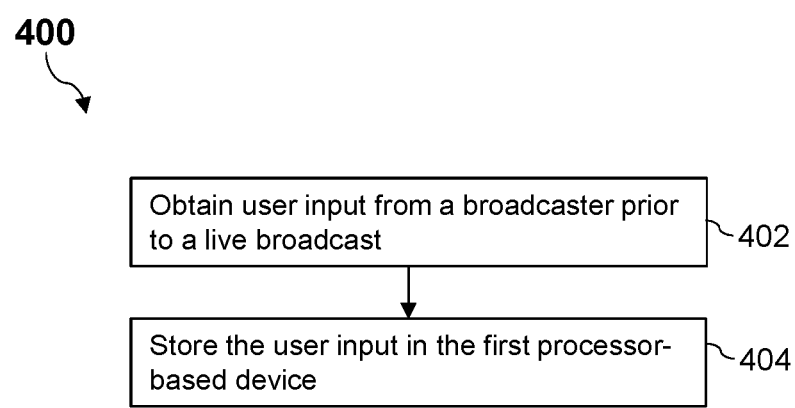
FIG. 4 shows a flow chart of a method for obtaining and storing user input from a broadcaster prior to live broadcast.
Figure 5A:
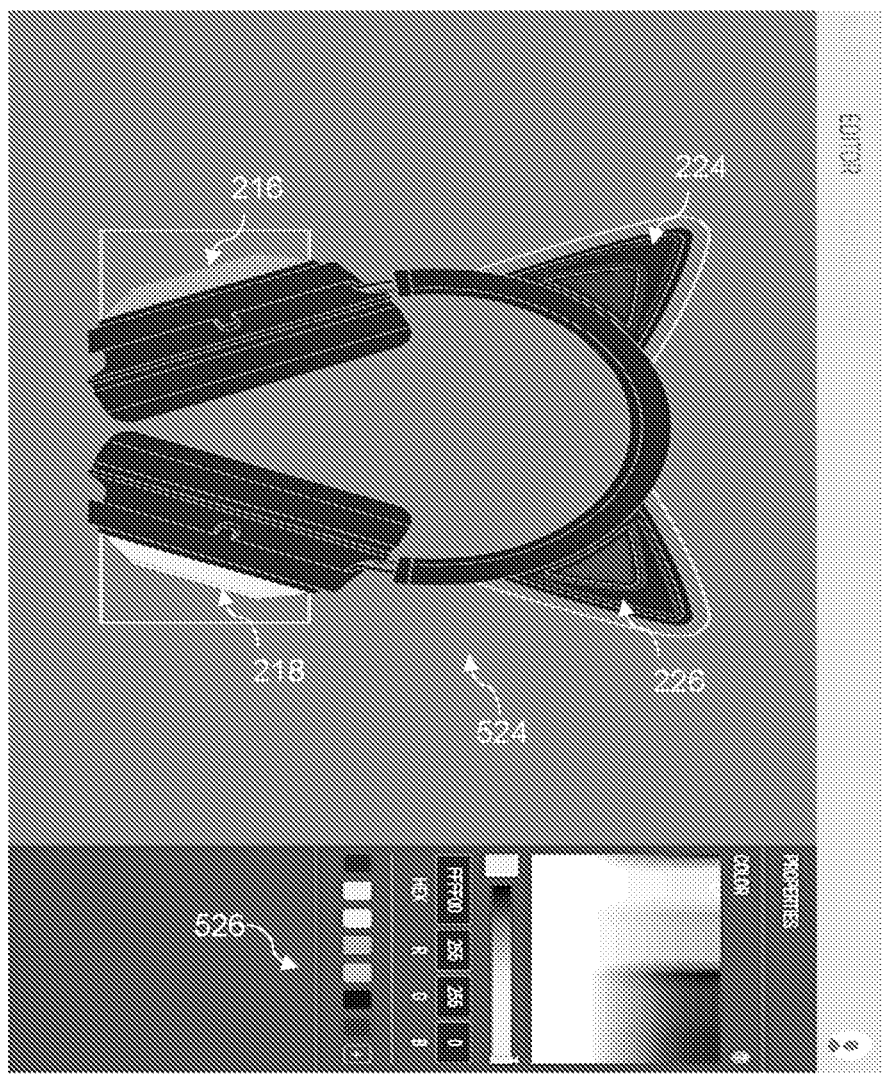
FIGS. 5A to 5B show screenshots of a graphical user interface of an example application that may be run by a processor-based device of a broadcaster for obtaining user input.
Figure 5B:
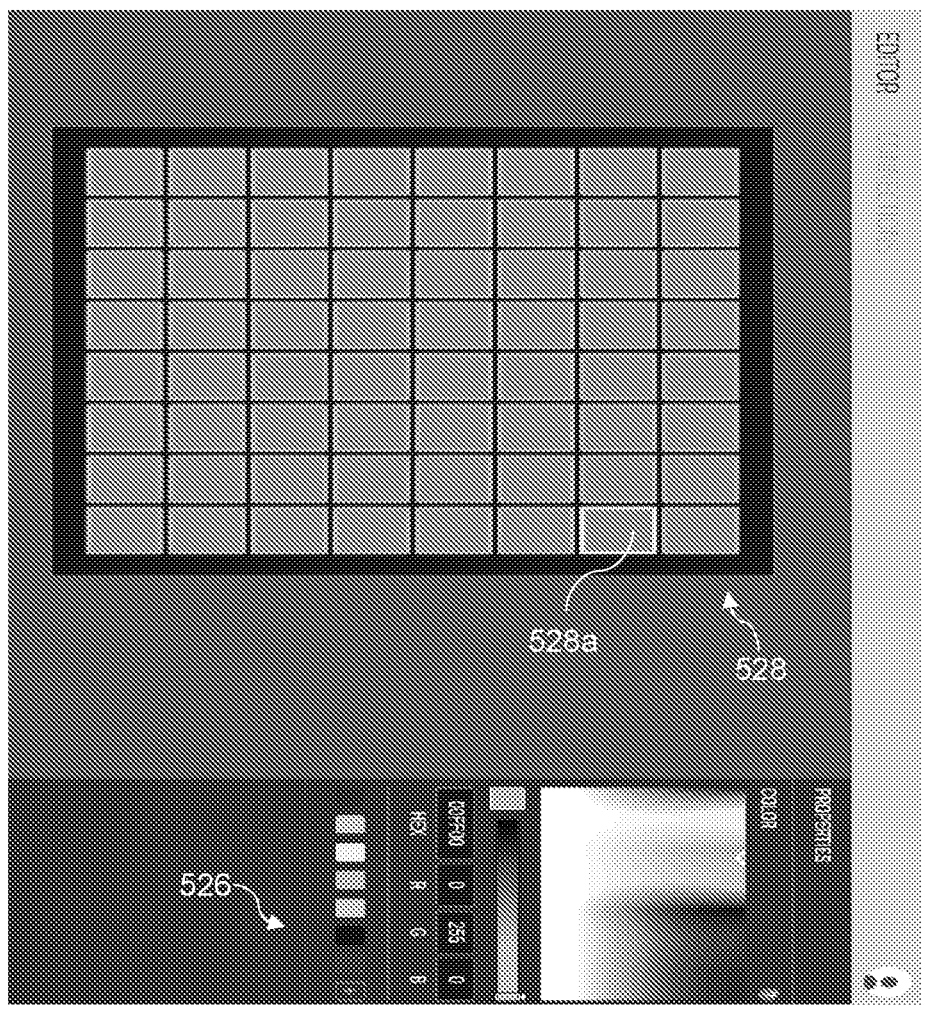

FIG. 4 shows a flow chart of a method 400 for obtaining and storing user input from a broadcaster (or in other words, a user) prior to a live broadcast, where the user input may be for controlling the one or more light display units of the one or more computer peripheral devices (e.g. light display unit 216, 218, 224, 226 of the headset 200 or light display unit 318 of the microphone 300). Each light display unit may include a matrix of independently controllable light emitting elements and each light emitting element of each light display unit may be configured to adopt one or more states out of a plurality of states. The method 400 may be performed by the first processor-based device of the broadcaster, where the first processor-based device may be operative to run an application configured to obtain the user input. FIGS. 5A to 5B show a graphical user interface (GUI) of an example application that may be run by the first processor-based device for obtaining the user input.

As shown in FIG. 4, at 402, a user input unit of the first processor-based device may obtain user input from a broadcaster prior to a live broadcast. The implementation of 402 will be discussed below with reference to FIGS. 5A to 5B. At 404, the user input may be stored in the first processor-based device, for example in a computer readable medium/memory of the first processor-based device.

At 402, user input may be obtained for multiple types of events and the user input for each type of event may indicate the following: (i) one or more light display units to be changed upon occurrence of the type of event; and (ii) an adjustment to be made to each light emitting element of each light display unit to be changed.

For example, an application with a graphical user interface (GUI) may provide a platform for obtaining the user input indicating the above-mentioned (i) one or more light display units to be changed upon occurrence of each type of event.

The user may first be presented with a "DASHBOARD" interface of the GUI when the first processor-based device runs the example application. The application may provide an instruction message to the broadcaster on the "DASHBOARD" to navigate to an "ALERTS" interface to provide user input.

In various embodiments, the user input unit of the first processor-based device may obtain user input for one type of event separately from user input for another type of event. For example, in various embodiments, the processor-based device may obtain user input indicating one or more light display units to be changed/controlled upon occurrence of one type of event separately from user input indicating one or more light display units to be changed/controlled upon occurrence of another type of event. By way of example, at the "ALERTS" interface, the application may provide a list of categories of events. This may include for example, a "Follows" category, a "Subscriptions" category, a "Cheer" category, a "Chat Message" category, a "Whisper" category, a "Host" category and a "Raid" category. The user may select one category of event each time and upon selection of a particular category of event, the user may be presented with an instruction message to provide one or more computer peripheral devices with light display unit(s) to be changed upon occurrence of a type of event in this category. In other words, the user input unit of the first processor-based device may obtain user input indicating the light display units to be changed upon occurrence of each type of event in each category. In various embodiments, the user may be further presented with a predetermined list of computer peripheral devices and the user may select one or more computer peripheral devices from this predetermined list. The computer peripheral devices in the predetermined list may be in different groups to facilitate the user's selection. In some embodiments, the computer peripheral devices that may be selected by the user may be limited to those connected to the first processor-based device and the user may receive an error message if he/she tries to select an unconnected computer peripheral device. In some embodiments, the user may be presented with a warning message (e.g. "the more devices selected, the higher the processor usage") to advise the user to select only the computer peripheral devices expected to be used during the live broadcast.

In various embodiments, the user input unit of the first processor-based device may obtain user input defining each type of event. For example, certain types of events may be defined as having occurred once an action has happened and these events may be defined without user input. For example, a "Follows" event and a "Subscriptions" event may be defined (in the "Follows" and "Subscriptions" categories) as having occurred when a viewer follows the broadcaster's channel and subscribes respectively. However, certain types of events may be defined by user input, for example, user input indicating a condition such as a number of occurrences of an action. For example, the user may be presented with an instruction message (in the "Cheer", "Chat Message", "Whisper", "Host" and "Raid" categories) requesting the user to define a "Cheer" event, a "Chat message" event, a "Whisper" event, a "Host" event and a "Raid" event based on a number of occurrences of a "cheer" action, a "chat message" action, a "viewing" action, or a "raid" action. In the "Chat Message" category, the types of "Cheer" events may alternatively be defined by a number of bits received from the viewers. For certain categories, the user may be presented with a further option, such as to indicate whether a type of event is defined for one or both of an "Auto Host" and a "Manual Host". For some categories, different types of events may be defined in the same category based on different conditions which may or may not be user-defined. For instance, different types of events in a category may be defined based on a different number of occurrences of an action. For example, different types of "Whisper" events may be defined in different tabs based on a different number of occurrences of a "chat message" action (each action indicated by presence of a chat line). The broadcaster may be presented with a drop-down box with selectable values and/or may indicate any number (even if the number is not in the drop down box) to define the type of event. Different types of events may also or alternatively be defined in the same category based on characteristics of the actions related to the category. By way of example, different types of events may be defined in different tabs of the "Subscriptions" category based on whether the "subscription" action is a normal/general subscription, a resubscription or a gifted subscription.

In various embodiments, the user input unit of the first processor-based device may obtain user input indicating whether to change any light display unit upon occurrence of a type of event. For instance, the user may be presented with a toggle button for each category in the example application, where the status of the toggle button for that category may indicate whether to change any light display unit upon occurrence of all types of events in that category. For example, if the toggle button is indicated as "on" during a live streaming, the processor-based device may change one or more light display units when a viewer follows or subscribes to the broadcaster's channel but if the toggle button is indicated as "off", the one or more light display units may not be changed when a viewer follows or subscribes. By way of example, more than one type of event may be defined, the user may be provided with another toggle button for each type of event to indicate whether to change one or more light display units upon occurrence of that type of event.

The GUI of the example application may obtain the user input indicating the above-mentioned (ii) adjustment to be made to each light emitting element of each light display unit to be changed. In various embodiments, user input indicating this may include at least one set of states for adjusting the light emitting elements of the light display unit. In various embodiments, each state may represent one or both of a colour of the light emitting element and a brightness of the light emitting element.

In various embodiments, the user input unit of the first processor-based device may obtain user input indicating, for a type of event and for a light display unit to be changed upon occurrence of the type of event, one of a plurality of predetermined light display outputs. The predetermined light display outputs may include preset still graphics or animations such as light effects or animated graphics, and may be stored in the first processor-based device, for example, in a computer readable medium/memory of the first processor-based device. In various embodiments, each predetermined light display output may include at least one set of states for adjusting the light emitting elements of the light display unit. In some embodiments, at least one predetermined light display output may include multiple sets of states for adjusting the light emitting elements of the light display unit and a time instance for each set of states. For example, a plurality of predetermined light display outputs can be stored in the application, and an instruction message can be sent to the user to select one of these predetermined light display outputs as the light display output to be displayed on a light display unit upon occurrence of a type of event. Same or different predetermined light display outputs may be selected for different types of events. In various embodiments, the light display outputs may be referred to as Chroma lighting effects. In various embodiments, the predetermined light display outputs may be referred to as quick effects and may include effects such as "Wave", "Fire", "Reactive", "Ripple", "Spectrum Cycling", "Starlight", "Static", "Breathing", "Wheel" and "blinking" effects as known to those skilled in the art. In various embodiments, instead of selecting from the "EDITOR" interface, the user may be presented with an option to upload a predetermined light display output as the light display output to be displayed upon occurrence of a type of event. For example, the user may upload a predetermined logo, image or gif animation.

In various embodiments, the user input unit of the first processor-based device may obtain user input indicating, for a type of event and for a light display unit to be changed upon occurrence of the type of event, at least one set of states for adjusting the light emitting elements of the light display unit. In other words, the user may design his/her own light display output (e.g. still graphics or animations) to be displayed by the light display unit upon occurrence of the type of event.

In various embodiments, the user input may indicate a set of states having a same state for all the light emitting elements of the light display unit. For example, as shown in FIG. 5A, the user may be presented with an "EDITOR" interface and a virtual image of a computer peripheral device, such as a virtual image 524 of the headset 200. The user may then select one of the light display units 216, 218, 224, 226 on the headset 200, and select a single colour (from for example, a colour palette 526) to be set as a state of each light emitting element 216a, 218a, 224a, 226a, 224b, 226b, 224c, 226c of the light display unit 216, 218, 224, 226. As shown in FIG. 5A, the user may select different colours for different light display units 216, 218, 224, 226.

In various embodiments, the user input may indicate different states for adjusting different light emitting elements of the light display unit. For example, as shown in FIG. 5B, a virtual image 528 of a light display unit (which may be a light display unit from a computer peripheral device such as the headset 200 or the microphone 300) may be provided. The user may select each of the light emitting elements (e.g. light emitting element 528a) of the light display unit separately from the other light emitting elements, and select a colour (from for example, the colour palette 526) for the light emitting element. Accordingly, the user may select different colours for different light emitting elements.

In various embodiments, the user input unit of the first processor-based device may obtain user input indicating, for a type of event and for a light display unit to be changed upon occurrence of the type of event, multiple sets of states for adjusting the light emitting elements of the light display unit and a time instance for each set of states. Although not shown in the figures, the user may be allowed to design not only still graphics, but also animated graphics or light effects. For example, for each light emitting element, the user may be presented with an option to select a number of colours and a sequence of the colours for the light emitting element at consecutive time instances within a time period. Each colour selected by the user may be the colour of the light emitting element at a respective time instance within the time period. This allows the user to design an animated graphic or light effect. In various embodiments, user input indicating a time instance for each set of states may include a time interval between consecutive sets of states to be displayed at consecutive time instances. For example, in the "EDITOR" interface, the user may be presented with an option to indicate this time interval. Accordingly, the user may be able to design flashing colours by providing to the "EDITOR" interface, a number of flashes (corresponding to the number of colours selected by the user) and a time interval between the flashes.

As mentioned above, the user input indicating an adjustment to be made to each light emitting element of each light display unit to be changed may include at least one set of states for adjusting the light emitting elements of the light display unit. In various embodiments, the user input unit of the first processor-based device may obtain further user input indicating an orientation of a light display output defined by the at least one set of states for adjusting the light emitting elements of the light display unit. The light display output may be a graphic, for example, an emote and may be designed by the user or selected by the user from predetermined light display outputs. Although not shown in the figures, the user may be presented with an option to select the orientation of the light display output, where the option may allow the user to rotate the light display output by increments of a certain angle e.g. 90 degrees.

In various embodiments, the user input unit of the first processor-based device may obtain user input providing a base set of states for the light emitting elements of each light display unit. The base set of states may represent a base light display output (e.g. a base emote or a base lighting effect) to be displayed on the light display unit. Although not shown in the figures, the user may be presented with a toggle button to indicate if the base light display output should be displayed on a light display unit when it is determined that no changes are to be made to the light display unit. When this toggle button is turned off, the display on a light display unit when it is determined that no changes are to be made to the light display unit may be controlled differently (e.g. by another application).

Figure 6:
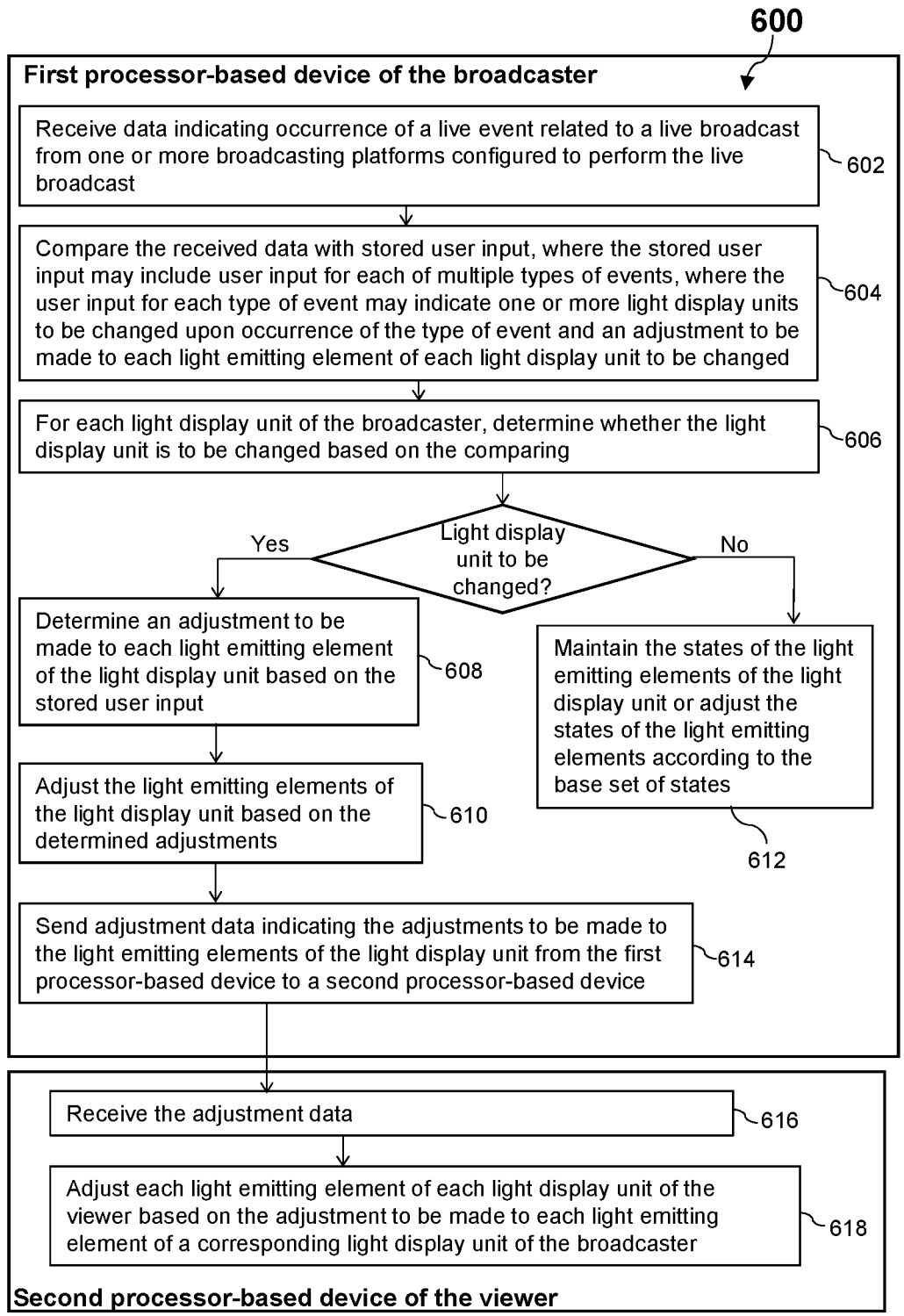
FIG. 6 shows a flow chart of a method of controlling one or more light display units during a live broadcast.

FIG. 6 shows a flow chart of a method 600 of controlling one or more light display units during a live broadcast. In various embodiments, each light display unit may include a matrix of independently controllable light emitting elements. The method may be performed by the first processor-based device, where the first processor-based device may be operative to run on one or more broadcasting platforms (e.g. Twitch, Huya etc.) configured to perform the live broadcast. The one or more light display units may include a first subset of light display units having at least one light display unit connected to the first processor-based device of the broadcaster. For instance, the first subset of light display unit(s) may be attached to computer peripheral device(s) connected to the first processor-based device.

In the embodiment shown in FIG. 6, the method 600 may further include controlling a second subset of light display units having at least one light display unit connected to a second processor-based device (e.g. a host computer or a computing device) of a viewer. For instance, the second subset of light display unit(s) may be attached to computer peripheral device(s) connected to the second processor-based device. Each light display unit of the second subset may correspond to a light display unit of the first subset. The correspondence may be that the light display units are attached to similar computer peripheral devices. For example, a light display unit 216 of a headset 200 belonging to a viewer may correspond to a light display unit 216 of a headset 200 belonging to the broadcaster.

Referring to FIG. 6, the method 600 may include 602 to 618, where 602 to 614 may be performed by the first processor-based device of the broadcaster and 616 to 618 may be performed by the second processor-based device of the viewer. In some embodiments, the method 600 may only include controlling light display unit(s) connected to the first processor-based device of the broadcaster. In other words, 614 to 618 of the method 600 may be optional.

At 602, a data receiving unit of the first processor-based device may receive data from the one or more broadcasting platforms configured to perform the live broadcast. The data may indicate occurrence of a live event related to the live broadcast. For example, the live event may be of a type belonging to a "Follows" event.

At 604, a data comparing unit of the first processor-based device may compare the received data with stored settings. The stored settings may include settings for each type of multiple types of events, where the settings for each type of event may indicate one or more light display units to be changed upon occurrence of the type of event, and an adjustment to be made to each light emitting element of each light display unit to be changed. In some embodiments, user input may be obtained for one or more types of the multiple types of events and at least some of the settings may be configured based on the user input and stored. This user input may be obtained and stored (as settings) using the method as described with reference to FIGS. 4 and 5A to 5B above. However, the user input may be obtained and stored (as settings) using any other method as known to those skilled in the art. In some alternative embodiments, the settings may be configured independent of user input.

At 606, a light display controller of the first processor-based device may determine for each light display unit of the first subset (in other words, of the broadcaster), whether the light display unit is to be changed based on the comparing in 604. This may include determining the type of event to which the live event (whose occurrence is indicated by the received data) belongs, and determining whether the light display unit is one of the one or more light display units to be changed upon occurrence of the type of event to which the live event belongs. In various embodiments, determining whether each light display unit of the first subset is to be changed may be further based on the user input indicating whether to change any light display unit upon occurrence of the type of event to which the live event belongs.

At 608, if the light display unit is determined as to be changed, the light display controller of the first processor-based device may determine an adjustment to be made to each light emitting element of the light display unit based on the stored settings that may be configured based on user input. For example, this may be based on the predetermined light display output selected by the user or the light display output designed by the user (e.g. using the interfaces shown in FIGS. 5A to 5B). In various embodiments, if the light display unit is determined as not to be changed, the processor-based device may (at 612) maintain the states of the light emitting elements of the light display unit or may adjust the states of the light emitting elements according to the base set of states representing a base light display output as described above.

At 610, the light display controller of the first processor-based device may adjust the light emitting elements of the light display unit based on the determined adjustments. As mentioned above, the stored settings indicating an adjustment to be made to each light emitting element of a light display unit may include at least one set of states for adjusting the light emitting elements of the light display unit. In various embodiments, adjusting the light emitting elements of the light display unit based on the determined adjustments may include simultaneously adjusting the light emitting elements of the light display unit to adopt the states in the at least one set of states provided in the settings. The simultaneous changes may allow graphics such as a "heart" graphic to be displayed.

In various embodiments, the broadcaster may send data indicating the light display output(s) displayed on light display unit(s) of his/her computer peripheral devices to the viewer, so that the same light display output(s) may also be displayed on corresponding light display unit(s) of the viewer's computer peripheral devices.

Referring to FIG. 6, at 614, the light display controller of the first processor-based device may send adjustment data indicating the adjustments to be made to the light emitting elements of the light display units of the first subset from the first processor-based device of the broadcaster to the second processor-based device of the viewer. In various embodiments, the adjustment data may first be sent to the one or more broadcasting platforms and then sent to the second processor-based device. At 616, a data receiving unit of the second processor-based device may receive the adjustment data. At 618, a light display controller of the second processor-based device may adjust each light emitting element of each light display unit of the second subset based on the adjustment to be made to each light emitting element of a corresponding light display unit of the first subset. The adjustments at 618 may be based on the adjustment data received by the second processor-based device at 616. In various embodiments, there may be a time delay between adjusting the light emitting elements of each light display unit of the second subset and adjusting the light emitting elements of the corresponding light display unit of the first subset. For example, the light emitting elements of a light display unit of the second subset may be adjusted later than the light emitting elements of a corresponding light display unit of the first subset. Accordingly, the light display unit of the second subset may be changed later than the corresponding light display unit of the first subset. The time delay may be approximately equal to a time duration required for the broadcaster's video stream to be transmitted from the broadcaster's first processor-based device to the viewer's second processor-based device. This can allow the viewer to see the changes on his/her light display units as being synchronized with the changes on the broadcaster's light display units shown in the broadcaster's video stream.

In various embodiments, 610 and 618 of method 600 may be performed by sending control data from the first or second processor-based device to the computer peripheral device(s) having the light display unit(s). For example, the control data may be sent to the headset receiver 228 of the headset 200 or the microphone receiver of the microphone 300.

In various embodiments, method 400 and method 600 may be at least partially performed by running an analysis application on the first processor-based device, where the analysis application may be integrated with the one or more broadcasting platforms. For example, the application program interfaces (APIs) of the analysis application may be linked with the APIs of the broadcasting platform(s). The analysis application may allow the user the ability to adjust and customize the lighting profile on the light display units in the manner as described above. The analysis application may provide the user access to various "quick effects".

The integration of the analysis application with one or more broadcasting platforms may be done by the user by for example, having the user select a list of broadcasting platforms to be integrated with the analysis application. An option may be provided to the user to authorize one or more broadcasting platforms to communicate with the analysis application (for example, an ID may be used to access the analysis application and the ID may be supplied to the broadcasting platforms as well). In some embodiments, 602 to 608 of the method 600 may be performed using the analysis application which can be integrated with one or more broadcasting platforms, whereas 610, 612 may be performed using a control application (which may be referred to as "Chroma SDK" application) which may interact with the analysis application. Various computer peripheral devices may be compatible, or in other words, capable of communicating with the first processor-based device through the control application. For example, the headset receiver 228 of the headset 200 and the microphone receiver of the microphone 300 may be configured to receive data from the control application running on the first processor-based device.

Figure 7:
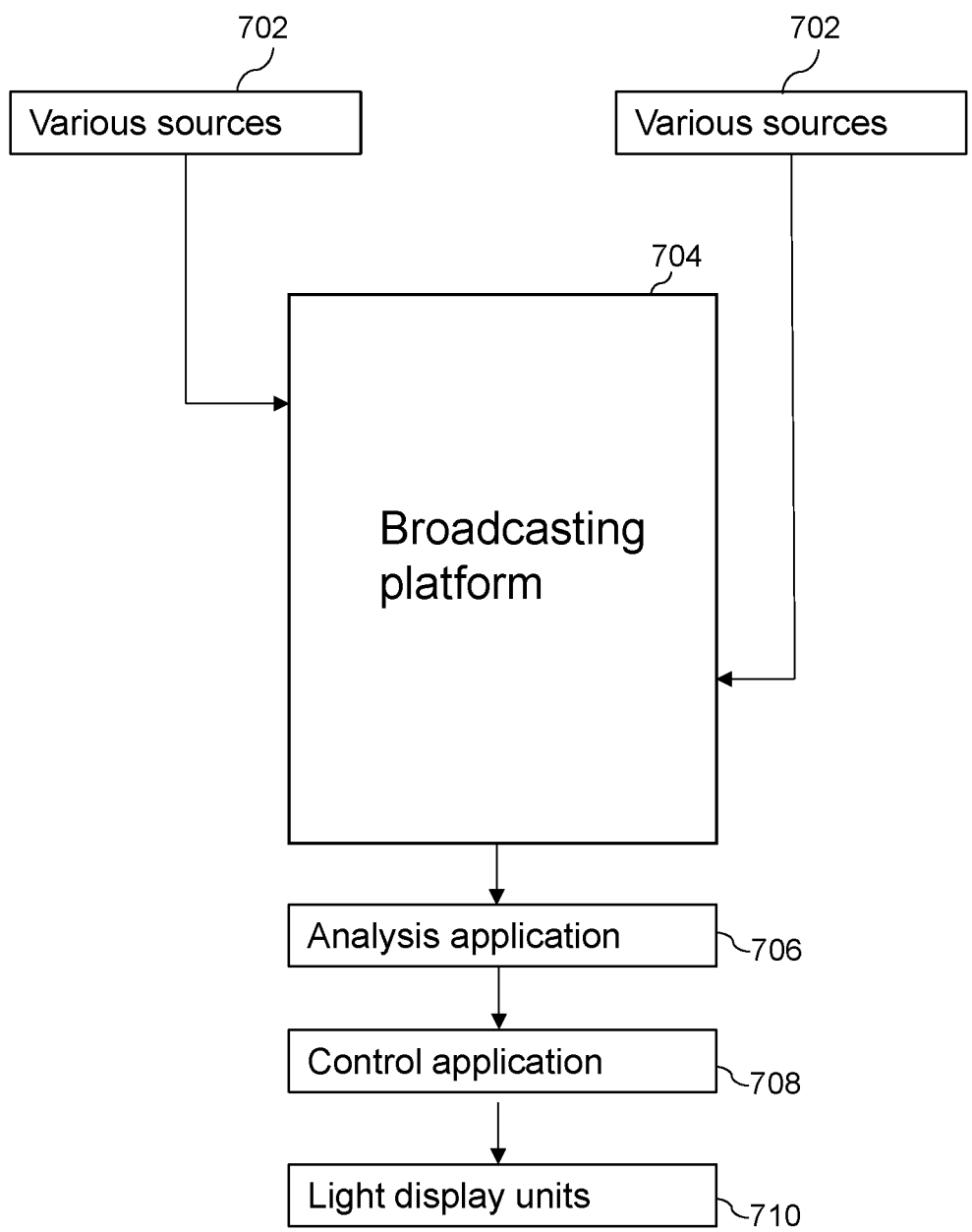
FIG. 7 shows an example of how an analysis application, that may be configured to perform at least a part of the method of FIG. 4 and/or FIG. 6, may be integrated with other applications.

FIG. 7 shows an example of how an analysis application 706 may be integrated with other applications 704, 708, where the application 704 may be a broadcasting platform and the application 708 may be a control application. During a live broadcast, the broadcasting platform 704 may be configured to receive data from various sources 702 such as different viewers, where the data may indicate occurrence of different live actions such as "Follow" actions (and thus, the occurrence of various live events related to the live broadcast). The broadcasting platform 704 may then send this data to the analysis application 706 which may determine how the light display units 710 should be changed using for example, 602-608, 612 of method 600. The analysis application 706 may then send data indicating how the light display units 710 should be changed to the control application 708 which may then send control data to the computer peripheral devices having the light display units 710.

In various embodiments, the above-mentioned analysis application and/or control application may be configured to send the adjustment data (indicating the adjustments to be made to the light emitting elements of the light display units of the broadcaster) from the broadcaster's first processor-based device to the viewer's second processor-based device through an extension API of the broadcasting platform, such as, but not limited to, the extension API of Twitch. This may be done by the broadcaster installing an extension (e.g. Chroma extension) through extension tabs of the broadcasting platform (e.g. Twitch extension tabs) configured to be run on the first processor-based device. In various embodiments, when the broadcaster sends the adjustment data as determined based on the stored settings in the first processor-based device, the broadcaster may be prevented from also sending other data indicating the adjustments to be made to the light emitting elements of the light display unit(s) triggered by other applications or platforms In various embodiments, the analysis application may be further integrated with a further application, such as a game application, configured to run on the first processor-based device. The further application may provide light display output(s) for the light display unit(s) of the broadcaster. Data indicating such light display output(s) may be sent from the further application to the analysis application which may then use this data to determine the adjustments to be made to the light emitting elements of the light display unit(s). In some embodiments, the adjustment data sent from the first to the second processor-based device may also include the aforementioned data from the further application.

In various embodiments, the categories of events may differ from the categories mentioned above. In various embodiments, further categories as known to those skilled in the art, such as, but not limited to, a "Donate" category may be included. Different types of "Donate" events in the "Donate" category may be defined based on different conditions related to "donation" actions e.g. number of "donation" actions, amounts donated in the "donation" actions. The donations in these "donation" actions may be in different currencies. Information of the "donation" actions may be derived from donation platforms that may also run simultaneously with the analysis applications (and in some embodiments, the control applications) on the first processor-based device. In various embodiments, the APIs of donation platforms may be linked to the APIs of the broadcasting platforms and the user may be able to select if he/she wishes for "Donate" events to trigger actions on the broadcasting platforms. For example, instead of or further to having the broadcasting platforms handle the "Follower" actions, the donation platforms may handle the "Follower" actions, such that a "Follower" action is triggered in response to a "Donate" action. Accordingly, lighting effects may be synced to an overlay function that the user may be using through the donation platforms.

The live broadcast may include multiple consecutive live events. In various embodiments, the determined adjustments for each light display unit upon occurrence of a first live event may include a first group of adjustments and the light display controller of the first processor-based device may form a queue for each light display unit, where the queue may include the first group of adjustments. The light display controller of the first processor-based device may then repeatedly perform the following: receive further data from the one or more broadcasting platforms, where the further data may indicate occurrence of a next live event related to the live broadcast; compare the received further data with the stored settings; and for each light display unit, determine whether the light display unit is to be changed based on the comparing of the received further data with the stored settings, if the light display unit is determined as to be changed, determine a next group of adjustments to be made to the light emitting elements of the light display unit based on the stored settings, and adjust the queue for the light display unit by adding the next group of adjustments after a previous group of adjustments. Accordingly, a queue for each light display unit indicating consecutive changes to be made to the light display unit may be formed. The light emitting elements of each light display unit may then be adjusted to adopt the groups of adjustments in the queue in sequential order (in other words, in the order of the groups of adjustments indicated in the queue).

Occasionally, the frequency of live events in a live broadcast may be high and the time period (e.g. about 5-10 seconds) to display each light display output may be longer than the time period between consecutive live events. This may result in a long queue being formed and hence, the light emitting elements of the light display unit(s) may adopt a group of adjustments long after the live event that triggered the group of adjustments. In various embodiments, the user input unit of the first processor-based device may further receive user input indicating to clear the queue for a light display unit of the first subset and the light display controller of the first processor-based device may adjust the queue for the light display unit by removing all groups of adjustments from the queue. For instance, the broadcaster may be presented with a virtual button which may be activated to clear the queue. When the virtual button is activated, the broadcaster may still receive notifications of further live events, but the light emitting elements of the light display unit(s) of the broadcaster may not be adjusted in response to some of the further live events.

In various embodiments, one or both of the first and second processor-based devices may receive user input indicating whether to display one or more characteristics of each type of live event. This display may be after the light emitting elements of the light display unit(s) are adjusted upon occurrence of the type of live event (e.g. after 610 or 618 of method 600). The characteristics of a type of live event may include a user name of the individual triggering the event, a time of the event or any other characteristic as known to those skilled in the art. For example, the user name of the individual triggering a live event may be displayed after an emote is displayed on a light display unit. In various embodiments, a toggle button may be presented to the broadcaster to indicate whether to display the one or more characteristics of each type of live event. In some embodiments, the toggle button may be deactivated by default. In various embodiments, the user input unit of the first processor-based device may further receive user input indicating how to display the one or more characteristics of each type of live event. For example, the broadcaster may be able to select whether text showing the characteristic of a type of live event scrolls left to right or right to left.

In various embodiments, the user input unit(s) of one or both of the first and second processor-based devices may receive user input indicating a display time period for which a light display output is to be displayed on a light display unit. In other words, the display time period represents a time period for which the light emitting elements of a light display unit should adopt a set of states (provided in a light display output). Adjusting the light emitting elements of the light display unit may then include configuring the light emitting elements of the light display unit to adopt the set of states for the display time period. The display time period may range from 5 to 10 seconds and may be set by the broadcasters to align with onscreen notifications from the broadcasting platforms or other applications. In various embodiments, a drop down box may be provided for the broadcaster to indicate the display time period. The drop down box may include values ranging from 1 to 999. In various embodiments, the analysis application may employ other drop down boxes which may also include values ranging from 1 to 999.

Figure 8:
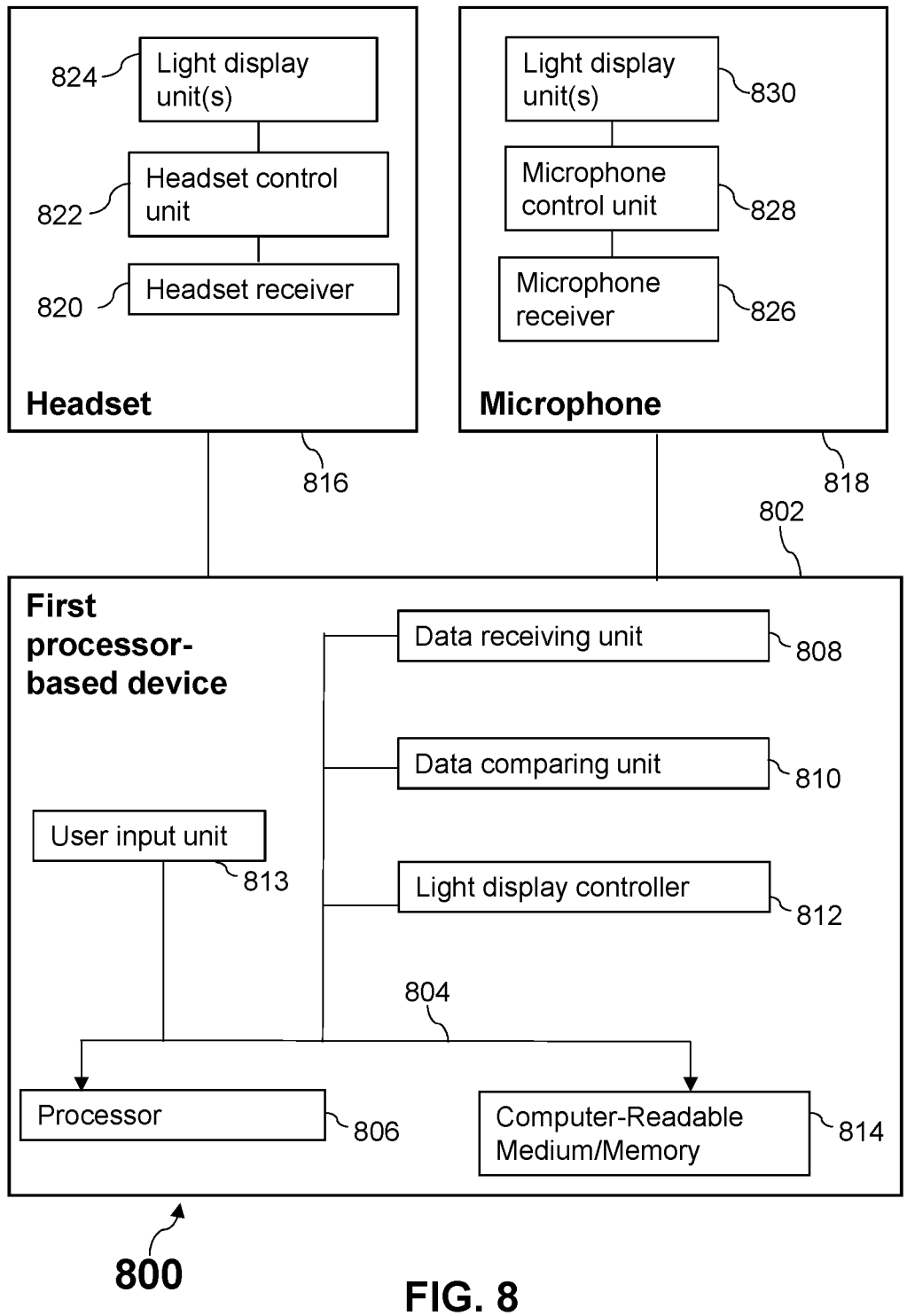
FIG. 8 shows an example of a hardware implementation for a live broadcast system that may be used by a broadcaster.

FIG. 8 shows an example of a hardware implementation for a live broadcast system 800 that may be used by a broadcaster, where the live broadcast system 800 may employ the first processor-based device 802 of the broadcaster and computer peripheral devices including the headset 816 and the microphone 818. In various embodiments, the first processor-based device 802 may implement the methods 400, 600 described above with reference to FIGS. 4 to 6.

As shown in FIG. 8, the first processor-based device 802 may be implemented with a bus architecture, represented generally by the bus 804. The bus 804 may include any number of interconnecting buses and bridges depending on the specific application of the processor-based device 802 and the overall design constraints. The bus 804 may link together various circuits including one or more processors and/or hardware components, represented by the processor 806, the components 808, 810, 812, 813 and the computer-readable medium/memory 814. The bus 804 may also link various other circuits such as timing sources, peripherals, voltage regulators, and power management circuits, which are well known in the art, and therefore, will not be described any further.

The first processor-based device 802 may include a processor 806 coupled to a computer-readable medium/memory 814. The processor 806 may be responsible for general processing, including the execution of software stored on the computer-readable medium/memory 814. The software, when executed by the processor 806, may cause the first processor-based device 802 to perform the various functions described supra for any particular apparatus. The computer-readable medium/memory 814 may also be used for storing data that is manipulated by the processor 806 when executing software. For example, the computer-readable medium/memory 814 may be used for storing the user input obtained using the method 400 as described with reference to FIG. 4. The first processor-based device 802 may further include the components 808, 810, 812, 813 that may be used for executing the methods 400, 600 as described with reference to FIGS. 4 to 6. The components 808, 810, 812, 813 may be software components running in the processor 806, resident/stored in the computer readable medium/memory 814, one or more hardware components coupled to the processor 806, or some combination thereof.

In one embodiment, the component 808 may be the data receiving unit of the first processor-based device described above. In one embodiment, the component 810 may be the data comparing unit of the first processor-based device described above. In one embodiment, the component 812 may be the light display controller of the first processor-based device described above. In one embodiment, the component 813 may be the user input unit of the first processor-based device as described above. In various embodiments, the second processor-based device that may be used by a viewer may be implemented with a similar hardware implementation as that of the first processor-based device 802, except that the components 808, 812 may respectively be the data receiving unit and the light display controller of the second processor-based device described above.

As shown in FIG. 8, the first processor-based device 802 may be coupled with a headset 816 and a microphone 818. The headset 816 may be substantially similar to the headset 200 as described with reference to FIGS. 2A to 2B and may include a headset receiver 820, a headset control unit 822 and light display unit(s) 824 substantially similar to those of the headset 200. The microphone 818 may be substantially similar to the microphone 300 as described with reference to FIGS. 3A to 3E, and may include a microphone receiver 826, a microphone control unit 828 and light display unit(s) 830 substantially similar to those of the microphone 300.

The following examples pertain to various embodiments.

Example 1 is a headset including: a headband; a first earcup attached to a first end of the headband and a second earcup attached to a second end of the headband, each of the first earcup and the second earcup including an interior surface and an exterior surface, wherein the interior surfaces of the first and second earcups may face each other and the exterior surfaces of the first and second earcups may face away from each other; a first light display unit including a matrix of independently controllable light emitting elements arranged along a boundary of the exterior surface of the first earcup; a headset receiver configured to receive data from a processor-based device; and a headset control unit configured to control the light emitting elements of the first light display unit based on the data received by the headset receiver.

In Example 2, the subject matter of Example 1 can optionally include that the light emitting elements of the first light display unit may be arranged on the entire exterior surface of the first earcup.

In Example 3, the subject matter of Example 1 or Example 2 can optionally include that the exterior surface of each of the first and second earcups may be at an angle to a plane formed by the corresponding interior surface of the first and second earcups.

In Example 4, the subject matter of Example 3 can optionally include that the exterior surface of each of the first and second earcups may be configured to taper away from the corresponding interior surface of the first and second earcups.

In Example 5, the subject matter of any one of Examples 1 to 4 can optionally include that the headset may further include an end surface arranged on the exterior surface of the first earcup, wherein the first light display unit may be arranged on the first earcup with respect to the end surface such that the first display unit is entirely external of the end surface.

In Example 6, the subject matter of any one of Examples 1 to 5 can optionally include that the headset may further include a second light display unit including a matrix of independently controllable light emitting elements arranged along a boundary of the exterior surface of the second earcup.

In Example 7, the subject matter of Example 6 can optionally include that the headset control unit may be configured to independently control the light emitting elements of the first light display unit and the second light display unit, respectively.

In Example 8, the subject matter of any one of Examples 1 to 7 can optionally include that the headset may further include at least one peripheral element and a respective further light display unit attached to each of the at least one peripheral element, wherein each further light display unit may include a plurality of independently controllable light emitting elements.

In Example 9, the subject matter of Example 8 can optionally include that the at least one peripheral element and the headband may be formed as a single integral unit.

In Example 10, the subject matter of Example 8 can optionally include that the at least one peripheral element may be detachably connected to the headband.

In Example 11, the subject matter of any one of Examples 8 to 10 can optionally include that the further light display unit of each of the at least one peripheral element may include a plurality of light emitting elements arranged along or inside a boundary of the at least one peripheral element.

In Example 12, the subject matter of any one of Examples 8 to 11 can optionally include that the headset control unit may be further configured to independently control the light emitting elements of the first light display unit and the light emitting elements of the further light display unit of each of the at least one peripheral element.

In Example 13, the subject matter of any one of Examples 1 to 12 can optionally include that each light emitting element of the first light display unit may be configured to adopt one or more states out of a plurality of states, wherein the data received by the headset receiver may include at least one state for each light emitting element, and the headset control unit may be configured to adjust each light emitting element according to the at least one state provided in the data for the respective light emitting element.

In Example 14, the subject matter of Example 13 can optionally include that the data received by the headset receiver may include a sequence of states for each light emitting element, and the headset control unit may be configured to adjust each light emitting element to adopt the states provided in the data, wherein an order in which each light emitting element adopts the states may correspond to the sequence of the states provided in the data.

In Example 15, the subject matter of Example 13 or Example 14 can optionally include that the state of each light emitting element may represent one or both of a colour of the light emitting element and a brightness of the light emitting element.

Example 16 is a microphone including: a base; a sound receiving element attached to the base; a shielding element; a light display unit arranged at least partially between the sound receiving element and the shielding element, wherein the light display unit may include a matrix of independently controllable light emitting elements arranged to project light towards the shielding element; a microphone receiver configured to receive data from a processor-based device; and a microphone control unit configured to control the light emitting elements of the light display unit based on the data received by the microphone receiver.

In Example 17, the subject matter of Example 16 can optionally include that the light display unit may be arranged partially between the sound receiving element and the shielding element.

In Example 18, the subject matter of Example 16 can optionally include that the light emitting elements of the light display unit may be arranged along a boundary of an intermediate surface, wherein the intermediate surface may surround the sound receiving element.

In Example 19, the subject matter of any one of Examples 16 to 18 can optionally include that the microphone may include a single light display unit.

In Example 20, the subject matter of any one of Examples 16 to 18 can optionally include that the microphone may further include a further light display unit, wherein the light display unit and the further light display unit may be arranged on opposite sides of the microphone.

In Example 21, the subject matter of Example 20 can optionally include that the microphone control unit may be further configured to independently control the light emitting elements of the light display unit and the further light display unit, respectively.

In Example 22, the subject matter of any one of Examples 16 to 21 can optionally include that each light emitting element of the light display unit may be configured to adopt one or more states out of a plurality of states, wherein the data received by the microphone receiver may include at least one state for each light emitting element, and the microphone control unit may be configured to adjust each light emitting element according to the at least one state provided in the data for the respective light emitting element.

In Example 23, the subject matter of Example 22 can optionally include that the data received by the microphone receiver may include a sequence of states for each light emitting element, and the microphone control unit may be configured to adjust each light emitting element to adopt the states provided in the data, wherein an order in which each light emitting element adopts the states may correspond to the sequence of the states provided in the data.

In Example 24, the subject matter of Example 22 or Example 23 can optionally include that the state of each light emitting element may represent one or both of a colour of the light emitting element and a brightness of the light emitting element.

Example 25 is a method of controlling one or more light display units, wherein each light display unit may include a matrix of independently controllable light emitting elements and wherein the method may include: receiving data from one or more broadcasting platforms configured to perform a live broadcast, wherein the data may indicate occurrence of a live event related to the live broadcast; comparing the received data with stored settings, wherein the stored settings may indicate, for each type of multiple types of events, one or more light display units to be changed upon occurrence of the type of event, and an adjustment to be made to each light emitting element of each light display unit to be changed; and for each light display unit, determining whether the light display unit is to be changed based on the comparing; if the light display unit is determined as to be changed, determining an adjustment to be made to each light emitting element of the light display unit based on the stored settings; and adjusting the light emitting elements of the light display unit based on the determined adjustments.

In Example 26, the subject matter of Example 25 can optionally include that determining whether the light display unit is to be changed based on the comparing may include: determining the type of event to which the live event belongs; and determining whether the light display unit is one of the one or more light display units to be changed upon occurrence of the type of event to which the live event belongs.

In Example 27, the subject matter of Example 25 or Example 26 can optionally include that the method may further include obtaining user input for one type of event separately from user input for another type of event.

In Example 28, the subject matter of any one of Examples 25 to 27 can optionally include that the method may further include obtaining user input defining each type of event.

In Example 29, the subject matter of any one of Examples 25 to 28 can optionally include that the method may further include obtaining user input indicating whether to change any light display unit upon occurrence of a type of event, and determining whether the light display unit is to be changed may be further based on the user input indicating whether to change any light display unit upon occurrence of the type of event to which the live event belongs.

In Example 30, the subject matter of any one of Examples 25 to 29 can optionally include that each light emitting element of each light display unit may be configured to adopt one or more states out of a plurality of states, and the settings indicating an adjustment to be made to each light emitting element of each light display unit to be changed may include at least one set of states for adjusting the light emitting elements of the light display unit; and adjusting the light emitting elements of the light display unit based on the determined adjustments may include simultaneously adjusting the light emitting elements of the light display unit to adopt the states in the at least one set of states provided in the settings.

In Example 31, the subject matter of Example 30 can optionally include that the method may further include obtaining user input indicating, for a type of event and for a light display unit to be changed upon occurrence of the type of event, one of a plurality of predetermined light display outputs, wherein each predetermined light display output may include at least one set of states for adjusting the light emitting elements of the light display unit.

In Example 32, the subject matter of Example 30 or Example 31 can optionally include that the method may further include obtaining user input indicating, for a type of event and for a light display unit to be changed upon occurrence of the type of event, at least one set of states for adjusting the light emitting elements of the light display unit.

In Example 33, the subject matter of Example 32 can optionally include that the user input may indicate different states for adjusting different light emitting elements of the light display unit.

In Example 34, the subject matter of Example 32 or Example 33 can optionally include that the user input may indicate multiple sets of states for adjusting the light emitting elements of the light display unit and a time instance for each set of states.

In Example 35, the subject matter of any one of Examples 30 to 34 can optionally include that the method may further include obtaining further user input indicating an orientation of a light display output defined by the at least one set of states for adjusting the light emitting elements of the light display unit.

In Example 36, the subject matter of any one of Examples 25 to 35 can optionally include that the one or more light display units may include a first subset of light display units and wherein the method may further include controlling a second subset of light display units, wherein the first subset of light display units may include at least one light display unit connected to a first processor-based device of a broadcaster, and the second subset of light display units may include at least one light display unit connected to a second processor-based device of a viewer.

In Example 37, the subject matter of Example 36 can optionally include that each light display unit of the second subset may correspond to a light display unit of the first subset; and wherein the method may further include: adjusting each light emitting element of each light display unit of the second subset based on the adjustment to be made to each light emitting element of a corresponding light display unit of the first subset.

In Example 38, the subject matter of Example 37 can optionally include that the data indicating occurrence of the live event related to the live broadcast may be received by the first processor-based device, and that the method may further include: sending adjustment data indicating the adjustments to be made to the light emitting elements of the light display units of the first subset from the first processor-based device to the second processor-based device; receiving the adjustment data by the second processor-based device; and wherein the adjusting of each light emitting element of each light display unit of the second subset may be based on the adjustment data received by the second processor-based device.

In Example 39, the subject matter of Example 37 or Example 38 can optionally include that there may be a time delay between adjusting the light emitting elements of each light display unit of the second subset and adjusting the light emitting elements of the corresponding light display unit of the first subset.

In Example 40, the subject matter of any one of Examples 25 to 39 can optionally include that the determined adjustments for each light display unit may include a first group of adjustments, and the method may further include forming a queue for each light display unit including the first group of adjustments and repeatedly performing the following: receiving further data from the one or more broadcasting platforms, wherein the further data may indicate occurrence of a next live event related to the live broadcast; comparing the received further data with the stored settings; and for each light display unit, determining whether the light display unit is to be changed based on the comparing of the received further data with the stored settings; if the light display unit is determined as to be changed, determining a next group of adjustments to be made to the light emitting elements of the light display unit based on the stored settings; and adjusting the queue for the light display unit by adding the next group of adjustments after a previous group of adjustments.

In Example 41, the subject matter of Example 40 can optionally include receiving user input indicating to clear the queue for a light display unit, and adjusting the queue for the light display unit by removing all groups of adjustments from the queue.

Example 42 is a device for controlling one or more light display units, wherein each light display unit may include a matrix of independent controllable light emitting elements and wherein the device may include: a data receiving unit configured to receive data from one or more broadcasting platforms configured to perform a live broadcast, wherein the data may indicate occurrence of a live event related to the live broadcast; a data comparing unit configured to compare the received data with stored settings, wherein the stored settings may indicate, for each type of multiple types of events, one or more light display units to be changed upon occurrence of the type of event, and an adjustment to be made to each light emitting element of each light display unit to be changed; and a light display controller configured to, for each light display unit, determine whether the light display unit is to be changed based on the comparing; if the light display unit is determined as to be changed, determine an adjustment to be made to each light emitting element of the light display unit based on the stored settings; and adjust the light emitting elements of the light display unit based on the determined adjustments.

Example 43 is a computer executing a program implementing the method of controlling one or more light display units according to any one of Examples 25 to 41.

Example 44 is a non-transitory computer-readable medium comprising instructions which, when executed by a processor, makes the processor perform a method of controlling one or more light display units, wherein each light display unit may include a matrix of independently controllable light emitting elements and wherein the method may include: receiving data from one or more broadcasting platforms configured to perform a live broadcast, wherein the data may indicate occurrence of a live event related to the live broadcast; comparing the received data with stored settings, wherein the stored settings may indicates, for each type of multiple types of event, one or more light display units to be changed upon occurrence of the type of event, and an adjustment to be made to each light emitting element of each light display unit to be changed; and for each light display unit, determining whether the light display unit is to be changed based on the comparing; if the light display unit is determined as to be changed, determining an adjustment to be made to each light emitting element of the light display unit based on the stored settings; and adjusting the light emitting elements of the light display unit based on the determined adjustments.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. A method of controlling one or more light display units, wherein the one or more light display units comprises a matrix of independently controllable light emitting elements and wherein the method comprises:
   receiving data from one or more broadcasting platforms configured to perform a live broadcast, wherein the data indicates occurrence of a live event related to the live broadcast;
   comparing the received data with stored settings, wherein the stored settings indicate at least one light display unit of the one or more light display units to be changed and at least one of the independently controllable light emitting elements to be adjusted for an event among multiple types of events, the at least one of the independently controllable light emitting elements is from the matrix of the independently controllable light emitting elements that is part of the at least one light display unit; and
   for the one or more light display units, determining whether a respective light display unit is to be changed based on the comparing;
   if the respective light display unit is determined as to be changed, determining an adjustment to be made to the independently controllable light emitting elements of the respective light display unit based on the stored settings; and
   adjusting the independently controllable light emitting elements of the respective light display unit based on the determined adjustments.

2. The method of claim 1, wherein determining whether the respective light display unit is to be changed based on the comparing comprises:
   determining the type of event to which the live event belongs; and
   determining whether the respective light display unit is one of the one or more light display units to be changed upon occurrence of the type of event to which the live event belongs.

3. The method of claim 1, further comprising obtaining user input for one type of event separately from user input for another type of event.

4. The method of claim 1, further comprising obtaining user input defining each type of event.

5. The method of claim 1, further comprising obtaining user input indicating whether to change any of the one or more light display units upon occurrence of a type of event, and wherein determining whether the one or more light display units are to be changed is further based on the user input indicating whether to change any of the one or more light display units upon occurrence of the type of event to which the live event belongs.

6. The method of claim 1, wherein the independently controllable light emitting elements of the respective light display unit is configured to adopt one or more states out of a plurality of states, and the settings indicating an adjustment to be made to the independently controllable light emitting elements of the respective light display unit to be changed comprises at least one set of states for adjusting the independently controllable light emitting elements of the respective light display unit; and
   wherein the adjusting the independently controllable light emitting elements of the respective light display unit is based on the determined adjustments comprises simultaneously adjusting the independently controllable light emitting elements of the respective light display unit to adopt the states in the at least one set of states comprised in the settings.

7. The method of claim 6, further comprising obtaining user input indicating, for a type of event and for the respective light display unit to be changed upon occurrence of the type of event, one of a plurality of predetermined light display outputs, wherein the predetermined light display output comprises at least one set of states for adjusting the independently controllable light emitting elements of the respective light display unit.

8. The method of claim 6, further comprising obtaining user input indicating, for a type of event and for the respective light display unit to be changed upon occurrence of the type of event, at least one set of states for adjusting the independently controllable light emitting elements of the respective light display unit.

9. The method of claim 8, wherein the user input indicates different states for adjusting different independently controllable light emitting elements of the respective light display unit.

10. The method of claim 8, wherein the user input indicates multiple sets of states for adjusting the independently controllable light emitting elements of the respective light display unit and a time instance for each set of states.

11. The method of claim 6, further comprising obtaining further user input indicating an orientation of a light display output defined by the at least one set of states for adjusting the independently controllable light emitting elements of the respective light display unit.

12. The method of claim 1, wherein the one or more light display units comprise a first subset of light display units and wherein the method further comprises controlling a second subset of light display units, wherein the first subset of light display units comprises at least one light display unit connected to a first processor-based device of a broadcaster, and the second subset of light display units comprises at least one light display unit connected to a second processor-based device of a viewer.

13. The method of claim 12, wherein the light display units of the second subset corresponds to the light display units of the first subset; and
   wherein the method further comprises:
   adjusting the light emitting elements of the light display units of the second subset based on the adjustment to be made to the light emitting elements of a corresponding light display unit of the first subset.

14. The method of claim 13, wherein the data indicating occurrence of the live event related to the live broadcast is received by the first processor-based device, wherein the method further comprises:
   sending adjustment data indicating the adjustments to be made to the independently controllable light emitting elements of the light display units of the first subset from the first processor-based device to the second processor-based device;
   receiving the adjustment data by the second processor-based device; and
   wherein the adjusting of the independently controllable light emitting elements of the light display units of the second subset is based on the adjustment data received by the second processor-based device.

15. The method of claim 13, wherein there is a time delay between adjusting the independently controllable light emitting elements of the light display units of the second subset and adjusting the independently controllable light emitting elements of the corresponding light display unit of the first subset.

16. The method of claim 1, wherein the determined adjustments for the light display units comprise a first group of adjustments, and the method further comprises forming a queue for the light display units comprising the first group of adjustments and repeatedly performing the following:
receiving further data from the one or more broadcasting platforms, wherein the further data indicates occurrence of a next live event related to the live broadcast; and
comparing the received further data with the stored settings; and
for the light display units, determining whether the light display unit is to be changed based on the comparing of the received further data with the stored settings;
if the light display unit is determined as to be changed, determining a next group of adjustments to be made to the independently controllable light emitting elements of the light display unit based on the stored settings; and
adjusting the queue for the light display unit by adding the next group of adjustments after a previous group of adjustments.

17. The method of claim 16, further comprising:
receiving user input indicating to clear the queue for the light display unit, and
adjusting the queue for the light display unit by removing all groups of adjustments from the queue.

18. A device for controlling one or more light display units, wherein the one or more light display units comprises a matrix of independent controllable light emitting elements and wherein the device comprises:
a data receiving unit configured to receive data from one or more broadcasting platforms configured to perform a live broadcast, wherein the data indicates occurrence of a live event related to the live broadcast;
a data comparing unit configured to compare the received data with stored settings, wherein the stored settings indicate at least one light display unit of the one or more light display units to be changed and at least one of the independently controllable light emitting elements to be adjusted for an event among multiple types of events, the at least one of the independently controllable light emitting elements is from the matrix of the independently controllable light emitting elements that is part of the at least one light display unit; and
a light display controller configured to, for the one or more light display units, determine whether a respective light display unit is to be changed based on the comparing;
if the respective light display unit is determined as to be changed, determine an adjustment to be made to each light emitting element of the respective light display unit based on the stored settings;
and adjust the light emitting elements of the respective light display unit based on the determined adjustments.

19. A computing system comprising:
at least one processor configured to execute a program for controlling one or more light display units wherein each light display unit comprises a matrix of independently controllable light emitting elements, the at least one processor is configured to:
receive data from one or more broadcasting platforms configured to perform a live broadcast, wherein the data indicates occurrence of a live event related to the live broadcast;
compare the received data with stored settings, wherein the stored settings indicate at least one light display unit of the one or more light display units to be changed and at least one of the independently controllable light emitting elements to be adjusted for an event among multiple types of events, the at least one of the independently controllable light emitting elements is from the matrix of the independently controllable light emitting elements that is part of the at least one light display unit; and
for one or more light display units, determine whether a respective light display unit is to be changed based on the comparing;
if the respective light display unit is determined as to be changed, determine an adjustment to be made to the independently controllable light emitting elements of the light display unit based on the stored settings; and
adjust the independently controllable light emitting elements of the respective light display unit based on the determined adjustments.

20. A non-transitory computer-readable medium comprising instructions which, when executed by a processor, makes the processor perform a method of controlling one or more light display units, wherein each light display unit comprises a matrix of independently controllable light emitting elements and wherein the method comprises:
receiving data from one or more broadcasting platforms configured to perform a live broadcast, wherein the data indicates occurrence of a live event related to the live broadcast;
comparing the received data with stored settings, wherein the stored settings indicate at least one light display unit of the one or more light display units to be changed and at least one of the independently controllable light emitting elements to be adjusted for an event among multiple types of events, the at least one of the independently controllable light emitting elements is from the matrix of the independently controllable light emitting elements that is part of the at least one light display unit; and
for the one or more light display units, determining whether a respective light display unit is to be changed based on the comparing;
if the respective light display unit is determined as to be changed, determining an adjustment to be made to the independently controllable light emitting element of the respective light display unit based on the stored settings; and
adjusting the independently controllable light emitting elements of the respective light display unit based on the determined adjustments.

* * * * *